(12) United States Patent
Reddy et al.

(10) Patent No.: US 12,395,847 B2
(45) Date of Patent: Aug. 19, 2025

(54) RANGING WITH BIOMETRIC INFORMATION

(71) Applicant: QUALCOMM Incorporated, San Diego, CA (US)

(72) Inventors: Varun Amar Reddy, San Diego, CA (US); Le Nguyen Luong, San Diego, CA (US); Krishna Kiran Mukkavilli, San Diego, CA (US); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 18/160,756

(22) Filed: Jan. 27, 2023

(65) Prior Publication Data

US 2024/0259812 A1    Aug. 1, 2024

(51) Int. Cl.
*H04W 12/30* (2021.01)
*B60R 25/24* (2013.01)
*B60R 25/25* (2013.01)
*B60R 25/30* (2013.01)
*G01S 13/76* (2006.01)
*G07C 9/25* (2020.01)

(52) U.S. Cl.
CPC ............. *H04W 12/30* (2021.01); *B60R 25/24* (2013.01); *B60R 25/252* (2013.01); *B60R 25/257* (2013.01); *B60R 25/305* (2013.01); *G01S 13/765* (2013.01); *G07C 9/257* (2020.01); *B60R 2325/101* (2013.01)

(58) Field of Classification Search
CPC ...... H04W 12/30; B60R 25/24; B60R 25/252; B60R 25/257; G01S 13/765; G07C 9/00309
See application file for complete search history.

(56) References Cited

U.S. PATENT DOCUMENTS

| | | | |
|---|---|---|---|
| 11,749,045 B2* | 9/2023 | Coniff | G07C 9/00174 |
| | | | 340/5.7 |
| 2018/0074161 A1* | 3/2018 | Rosenbaum | G01S 11/04 |
| 2020/0363524 A1 | 11/2020 | Yoon et al. | |
| 2022/0201492 A1 | 6/2022 | Park et al. | |
| 2023/0029683 A1* | 2/2023 | Li | H04W 4/40 |
| 2024/0243833 A1* | 7/2024 | Wang | G01S 7/006 |

OTHER PUBLICATIONS

International Search Report and Written Opinion—PCT/US2023/081248—ISA/EPO—Apr. 9, 2024.

* cited by examiner

*Primary Examiner* — Vernal U Brown
(74) *Attorney, Agent, or Firm* — Thien T. Nguyen

(57) ABSTRACT

Techniques are provided for authenticating a user based on ranging and biometric information. An example method for transmitting a ranging signal from a mobile device includes receiving biometric information from a user with the mobile device, generating a ranging signal including an indication of the biometric information with the mobile device, and transmitting the ranging signal with the mobile device.

42 Claims, 19 Drawing Sheets

RANGING WITH BIOMETRIC INFORMATION

BACKGROUND

The use of wireless devices for many everyday activities is becoming common. Modern wireless devices may make use of one or more wireless communication technologies. For example, a wireless device may communicate using a short range communication technology such as WiFi technology, Bluetooth technology, ultrawideband (UWB) technology, millimeter wave (mmWave) technology, etc. The use of short range communication technologies, such as WiFi and Bluetooth, in wireless devices has become much more common in the last several years and is regularly used in retail businesses, offices, homes, cars, manufacturing operations, and public gathering places. The larger bandwidth of UWB devices may be beneficial for ranging protocols used in high security applications such as digital keys. Some ranging messaging may be susceptible to over-the-air attacks to falsify time-of-arrival estimates. There is a need to improve the ranging security for wireless devices to support multiple use cases.

SUMMARY

An example method for transmitting a ranging signal from a mobile device according to the disclosure includes receiving biometric information associated with a user with the mobile device, generating a ranging signal including an indication of the biometric information with the mobile device, and transmitting the ranging signal with the mobile device.

An example method of authenticating a user of a mobile device utilizing ranging and biometric information according to the disclosure includes receiving biometric information for the user of the mobile device, determining a distance to the mobile device, and authenticating the user and the distance to the mobile device based at least in part on the biometric information.

An example method for mapping between biometric information and a ranging session according to the disclosure includes receiving biometric information associated with a user via one or more biometric sensors at a first time, authenticating the user based on the biometric information, obtaining one or more radio frequency signals transmitted from a mobile device associated with the user proximate to the first time, and storing signal information associated with the one or more radio frequency signals and the mobile device.

Items and/or techniques described herein may provide one or more of the following capabilities, as well as other capabilities not mentioned. Wireless devices may be configured to exchange positioning signals to determine a distance between the devices (e.g., based on time-of-flight measurements) and a bearing to one another (e.g., based on angle-of-arrival measurements). Biometric information may be obtained from a user and may be utilized in a radio frequency (RF) ranging exchange. The biometric information may be provided to an authenticating station via an out-of-band communication. Biometric information may be included in the ranging packets. Biometric information may be provided at a point of access concurrently with obtaining RF ranging measurements. A mapping between the biometric information and the RF ranging measurements may be generated. Subsequent access may be granted to the user based on RF ranging measurements and the mapping information. The RF ranging information may be used to predict a point of entry. The security of radio frequency ranging sessions may be improved. Other capabilities may be provided and not every implementation according to the disclosure must provide any, let alone all, of the capabilities discussed.

DETAILED DESCRIPTION

Techniques are discussed herein for authenticating a user based on ranging and biometric information. Wireless devices may be configured to determine a range between the devices based on exchanging radio frequency (RF) signals. Cellular, WiFi, Bluetooth, sidelink, ultrawideband (UWB), and other wireless technologies may utilize ranging signals such as positioning reference signals (PRS), fine timing messages (FTM), and other time-scheduled or contention-free techniques to determine the relative distance between stations. For example, wireless positioning technologies may be utilized to provide accurate relative positioning between devices within a limited range. Two wireless devices may be configured to exchange RF signals to determine time-of-flight (ToF) and angle-of-arrival (AoA)

information for the RF signals. In operation, however, some wireless ranging techniques may be susceptible to over-the-air attacks to falsify the ToA estimate. The techniques provided herein may utilize biometric information in combination with in-band and/or out-of-band communications to increase the security of wireless ranging messages. In an example, biometric information associated with a user of a mobile device may be provided to a target station during a ranging control phase. The biometric information may be included in messages in the ranging measurement exchange. In an example, a correlation between biometric information and ranging information may be determined at a point of access, and subsequent access may be granted based on ranging information. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
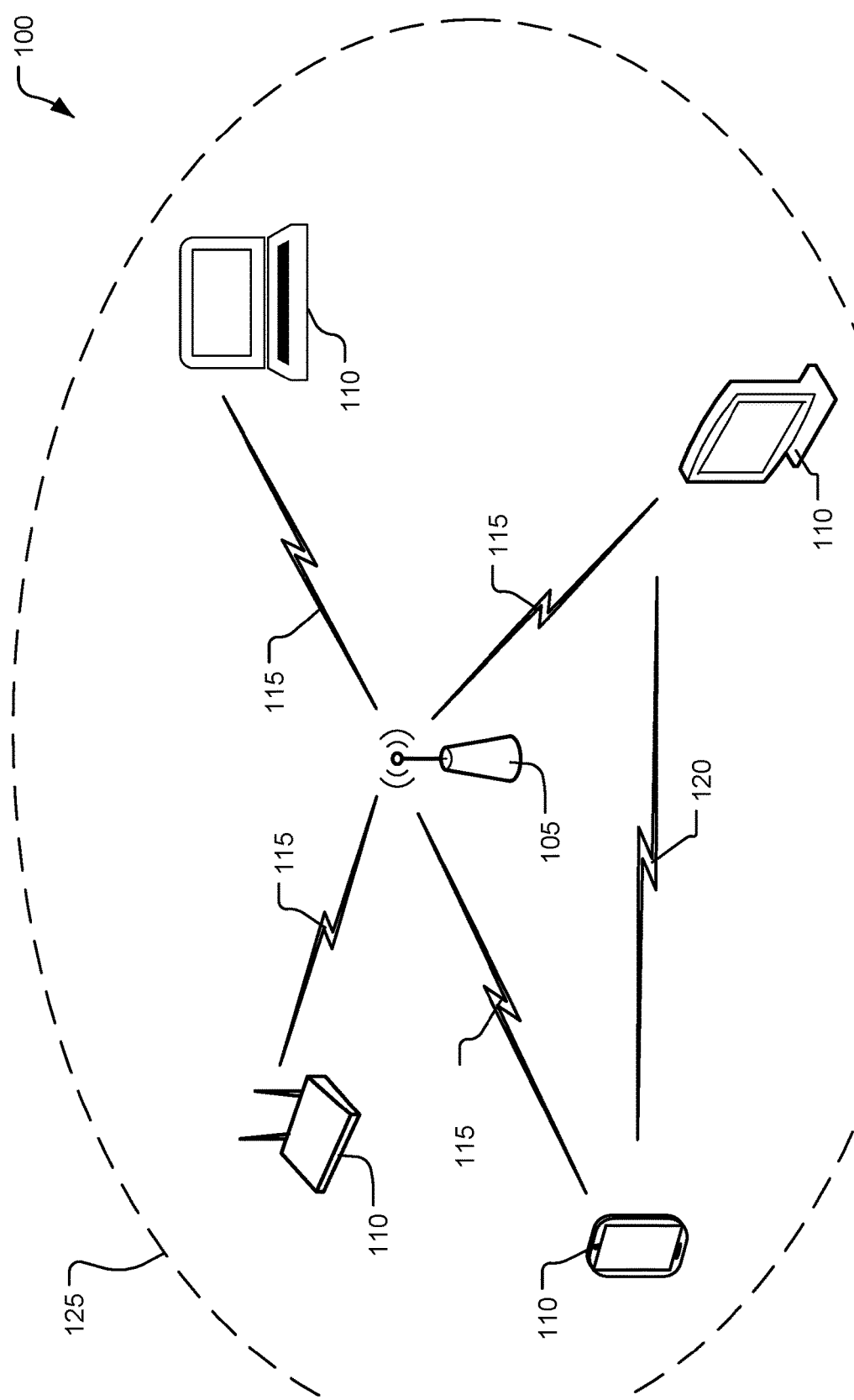
FIG. 1 is a block diagram of an example wireless local area network (WLAN).

Referring to FIG. 1, a block diagram illustrates an example of a WLAN network 100 such as, e.g., a network implementing IEEE 802.11 and IEEE 802.15 families of standards. The WLAN network 100 may include an access point (AP) 105 and one or more wireless devices 110 or stations (STAs) 110, such as mobile stations, head mounted devices (HMDs), personal digital assistants (PDAs), asset tracking devices, other handheld devices, netbooks, notebook computers, tablet computers, laptops, display devices (e.g., TVs, computer monitors, etc.), printers, IoT devices, asset tags, key fobs, vehicles, etc. The AP 105 and the wireless devices 110 may be WiFi, Bluetooth, and/or UWB capable devices. While one AP 105 is illustrated, the WLAN network 100 may have multiple APs 105. Each of the wireless devices 110, which may also be referred to as mobile stations (MSs), mobile devices, access terminals (ATs), user equipment(s) (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include WiFi Direct connections, connections established by using a WiFi Tunneled Direct Link Setup (TDLS) link, 5G-NR sidelink, PC5, UWB, Bluetooth, and other P2P group connections. The wireless devices 110 in these examples may communicate according to the WLAN radio and baseband protocol including physical and MAC layers from IEEE 802.11 and IEEE 802.15, and their various versions. For example, the one or more of the wireless devices 110 and the AP 105 may be configured to utilize WiFi, Bluetooth, and/or UWB signals for communications and/or positioning applications.

Figure 2:
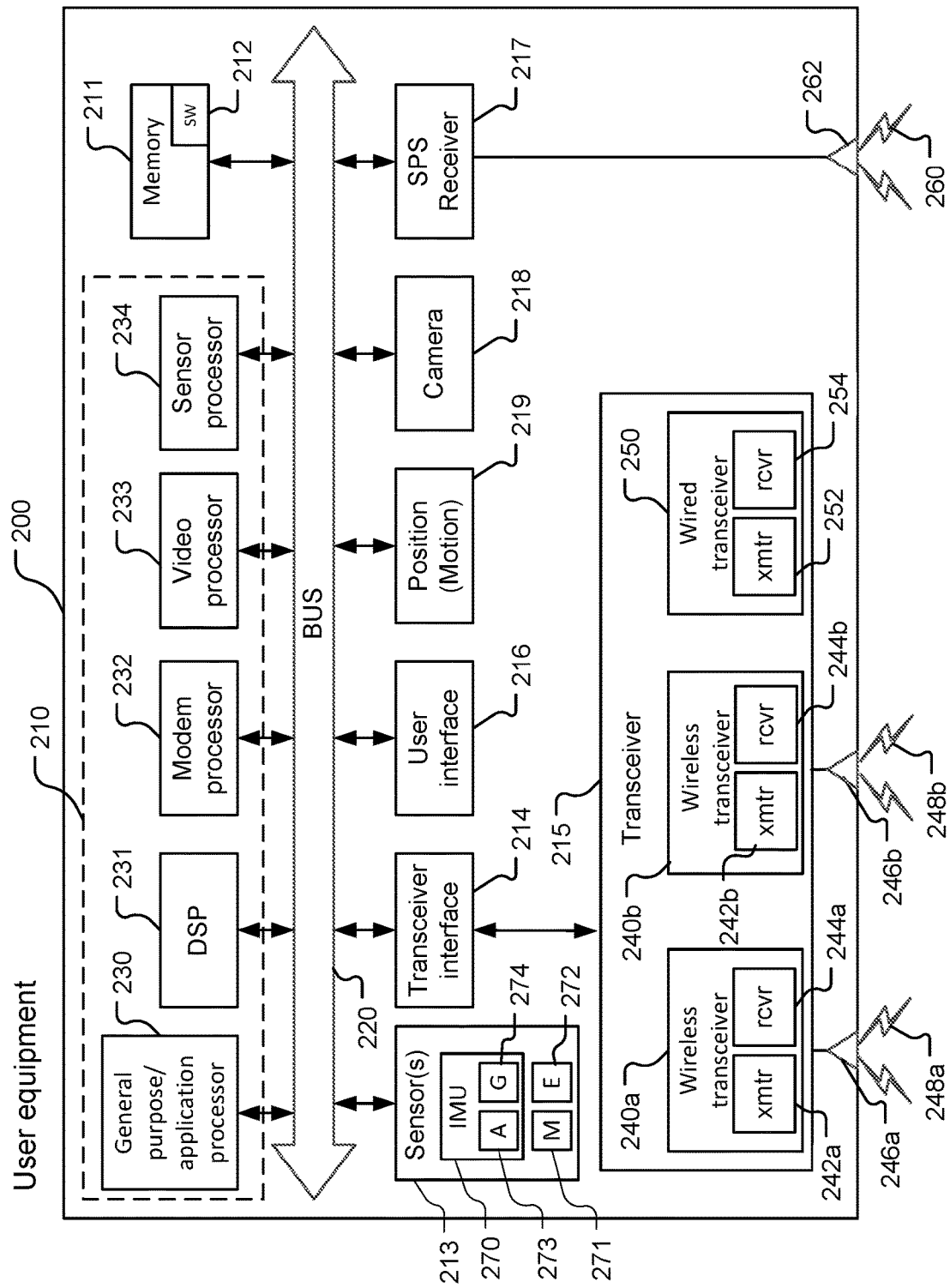
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240a, a second wireless transceiver 240b, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatuses (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240a-b. Other example configurations include one or more of the processors 230-234 of the processor 210, the memory 211, the wireless transceivers 240a-b, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240a-b, the memory 211 and a general-purpose processor 230. A multi-link device may simultaneously utilize the first wireless transceiver 240a on a first link using a first frequency band, and the second wireless transceiver 240b on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240a-b and a wired transceiver 250 configured to communicate with other devices through wireless connections and wired connections, respectively. In an example, each of the wireless transceivers 240a-b may include respective transmitters 242a-b and receivers 244a-b coupled to one or more respective antennas 246a-b for transmitting and/or receiving wireless signals 248a-b and transducing signals from the wireless signals 248a-b to wired (e.g., electrical and/or optical) signals and from wired (e.g., electrical and/or optical) signals to the wireless signals 248a-b. Thus, the transmitters 242a-b may be the same transmitter, or may include multiple transmitters that may be discrete components or combined/integrated components, and/or the receivers 244a-b may be the same receiver, or may include multiple receivers that may be discrete components or combined/integrated components. The wireless transceivers 240a-b may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11ax and 802.11be), WiFi, WiFi Direct (WiFi-D), Bluetooth®, IEEE 802.15 (UWB), Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216. In an example, the user interface 216 may include one or more biometric sensors configured to obtain biometric information from a user. For example, the biometric sensors may include a fingerprint capture device, a microphone (for voice input), the camera 218 (e.g., for facial recognition, iris detection), a display (e.g., for finger swipe recognition) or other such sensors. The IMU 270 may be configured to obtain motion data to determine biometric information such as the user's gait or step length. Other sensors in the UE 200 may also be used to obtain biometric information from a user.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with one or more of the antennas 246a-b. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240a-b) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248a-b) for trilateration or mulilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3A:
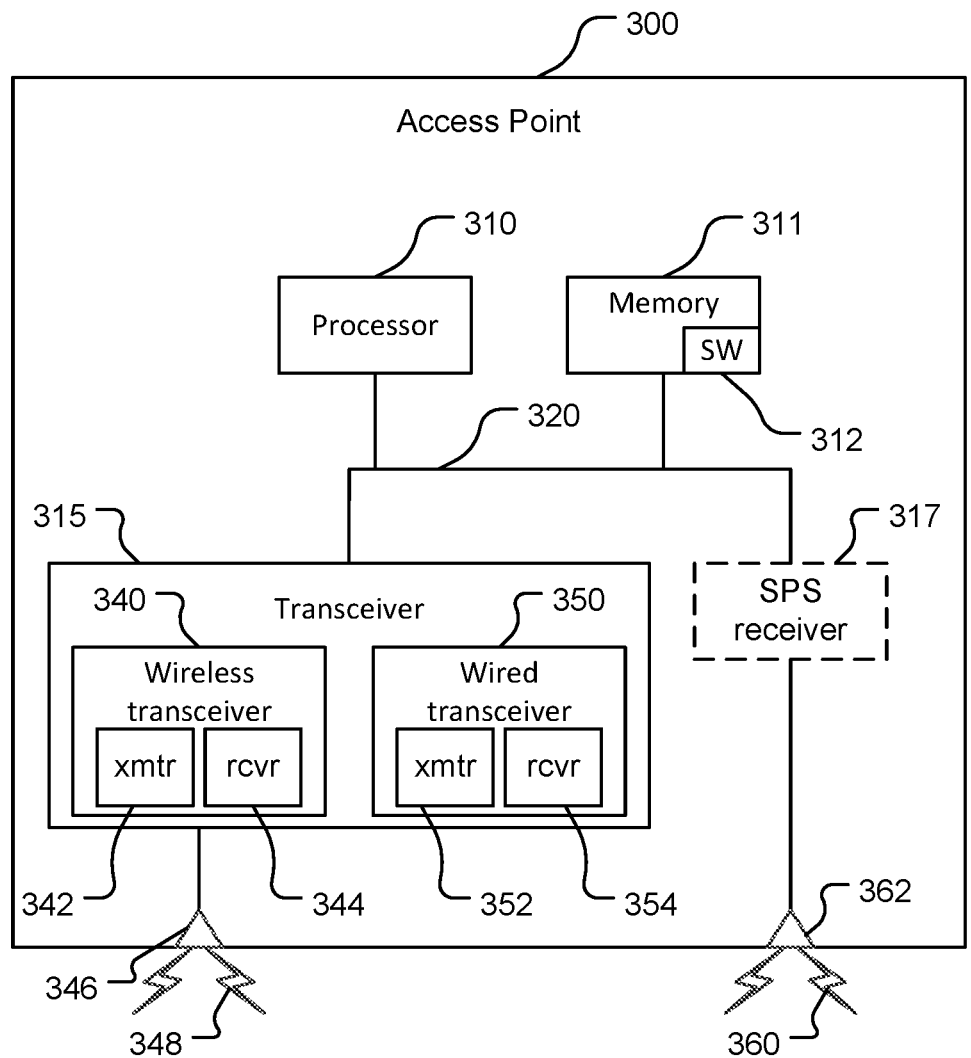
FIG. 3A is a block diagram of components of an example access point.

Referring also to FIG. 3A, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatuses (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax and 802.11be), WiFi, WiFi Direct (WiFi-D), Bluetooth®, IEEE 802.15 (UWB), Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 3B:
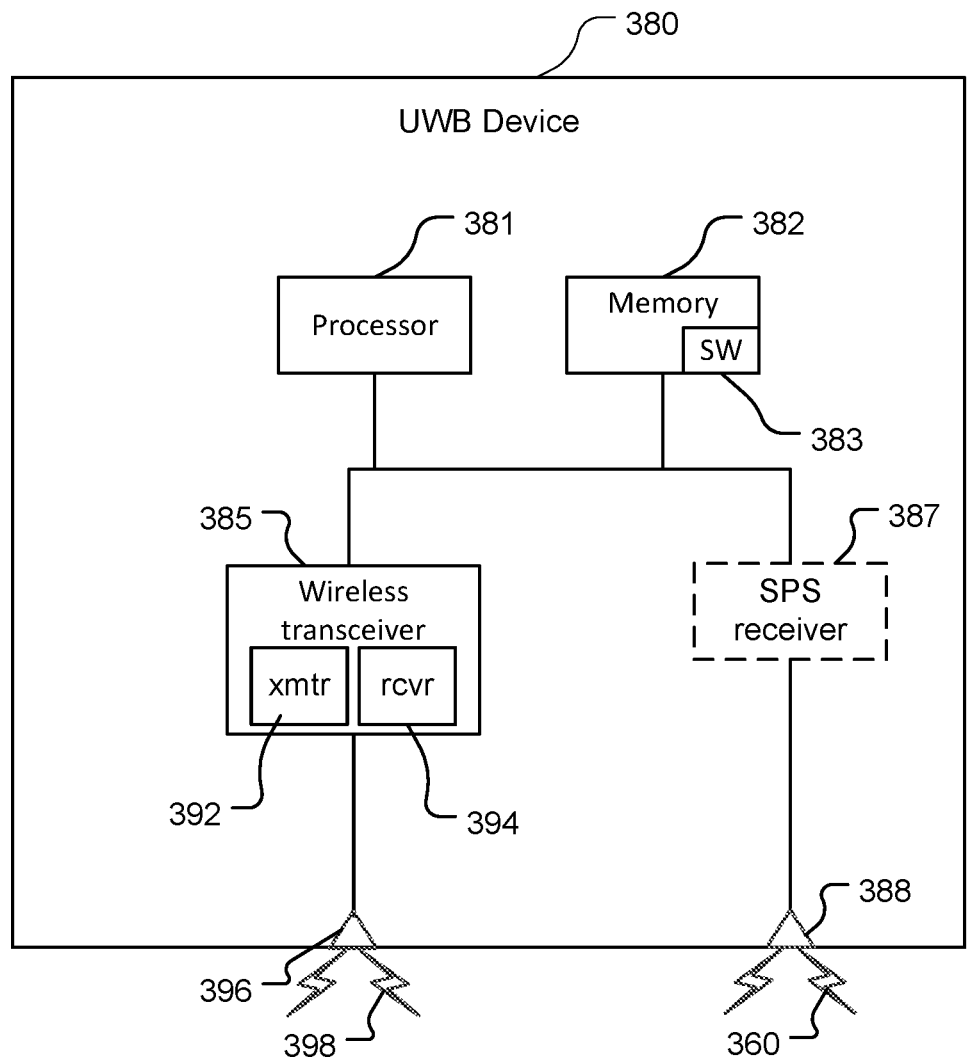
FIG. 3B is a block diagram of components of an example ultrawideband (UWB) device.

Referring also to FIG. 3B, an example of an UWB device 380 such as an asset tag, key fob, TV remote, security system (e.g., vehicle, commercial, etc.), or other device configured to send and receive UWB RF transmissions. The UWB device comprises a computing platform including a processor 381, memory 382 including software (SW) 383, a wireless transceiver 385, and (optionally) an SPS receiver 387. The SPS receiver 387 may be configured similarly to the SPS receiver 217 to be capable of receiving and acquiring SPS signals 360 via an SPS antenna 388. The processor 381 may include one or more intelligent hardware devices, e.g., a central processing unit (CPU), a microcontroller, an application specific integrated circuit (ASIC), etc. The processor 381 may comprise multiple processors (e.g., including a general-purpose/application processor, a DSP, a modem processor, a video processor, and/or a sensor processor as shown in FIG. 2). The memory 382 is a non-transitory storage medium that may include random access memory (RAM)), flash memory, disc memory, and/or read-only memory (ROM), etc. The memory 382 stores the software 383 which may be processor-readable, processor-executable software code containing instructions that are configured to, when executed, cause the processor 381 to perform various functions described herein. Alternatively, the software 383 may not be directly executable by the processor 381 but may be configured to cause the processor 381, e.g., when compiled and executed, to perform the functions. The description may refer to the processor 381 performing a function, but this includes other implementations such as where the processor 381 executes software and/or firmware. The description may refer to the processor 381 performing a function as shorthand for one or more of the processors contained in the processor 381 performing the function. The processor 381 may include a memory with stored instructions in addition to and/or instead of the memory 382. Functionality of the processor 381 is discussed more fully below.

The wireless transceiver 385 is configured to communicate with other devices through wireless connections using UWB protocols. For example, the wireless transceiver 385 may include a transmitter 392 and receiver 394 coupled to one or more antennas 396 for transmitting (e.g., on one or more uplink channels) and/or receiving (e.g., on one or more downlink channels) UWB wireless signals 398 and transducing signals from the UWB wireless signals 398 to wired (e.g., electrical and/or optical) signals and from wired (e.g., electrical and/or optical) signals to the UWB wireless signals 398. In an example, the wireless transceiver 385 may include multiple transmitters that may be discrete components or combined/integrated components, and/or the receiver 394 may include multiple receivers that may be discrete components or combined/integrated components. In an example, the wireless transceiver 385 may be configured to communicate signals according to a variety of radio access technologies (RATs) in addition to UWB technologies. For example, the wireless transceiver 385 may be also configured to utilize RATs such as IEEE 802.11 (including IEEE 802.11ax/az and 802.11be), WiFi, WiFi Direct (WiFi-D), Bluetooth®, IEEE 802.15 (UWB), Zigbee etc.

Figure 4:
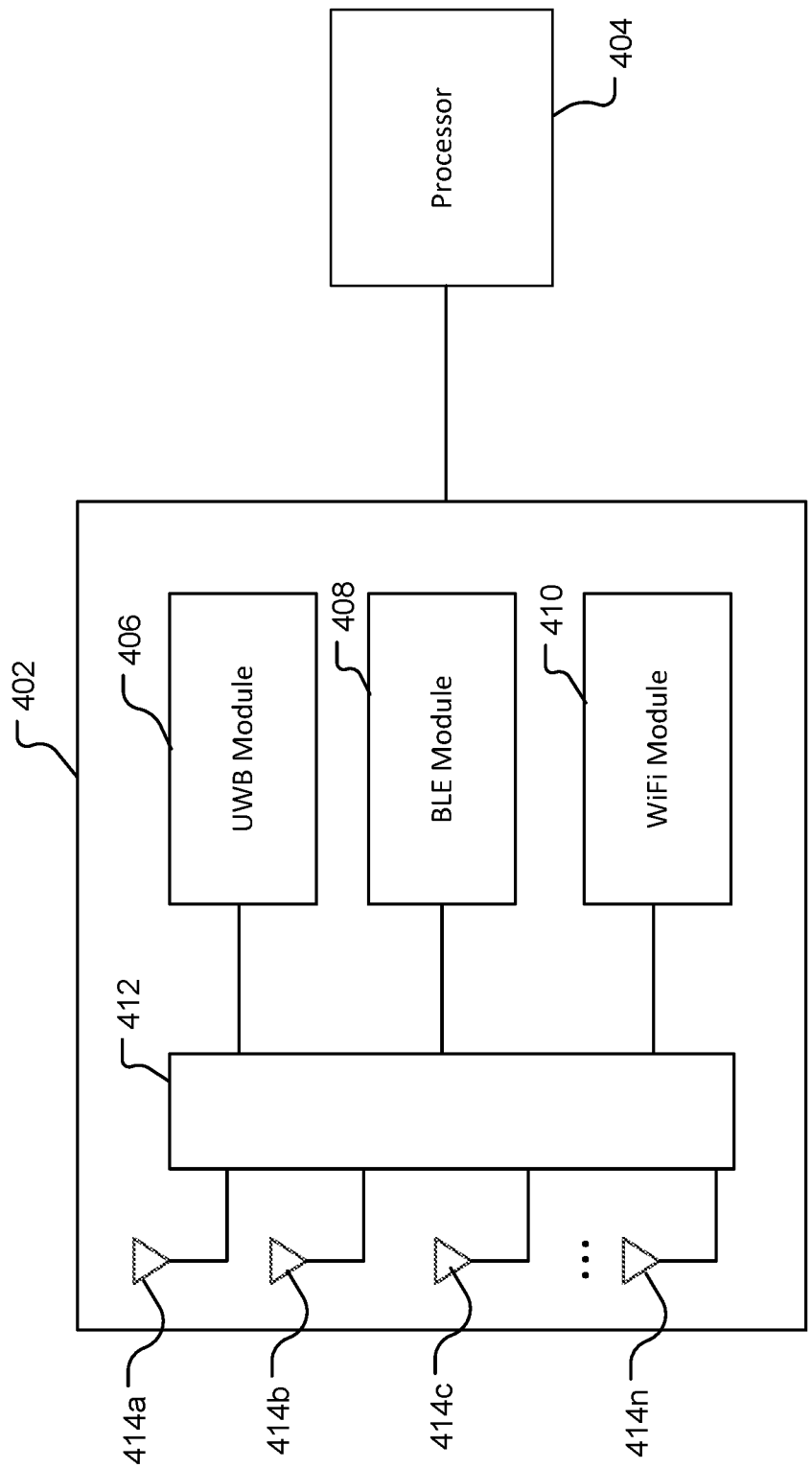
FIG. 4 is a block diagram of an example communications module with multiple transceivers.

Referring to FIG. 4, a block diagram of an example communications module 402 with multiple transceivers is shown. The communications module 402 may be used as a transceiver in a mobile device, such as the transceiver 215 in the UE 200, a transceiver in an access point, such as the transceiver 315 in the AP 300, or other RF device, such as the transceiver 385 in the UWB device 380. In an example, in a V2X network, the communication module may be included in a Roadside Unit (RSU). The communications module 402 may be communicatively coupled to a processor 404, such as the general-purpose processor 230 and/or the modem processor 232. One or more RF modules such as a UWB module 406, a BLE module 408, and a WiFi module 410 may be communicatively coupled to a plurality of antennas 414a-n via one or more multiplexers 412. The multiplexers 412 may include switches, phase shifters, and tuning circuits configured to enable one or more of the RF modules 406, 408, 410 to send and receive signals via one or more of the antennas 414a-n. For example, the WiFi module 410 and the UWB module 406 may be configured to utilize one or more of the antennas 414a-n based on operational frequencies. The phase shifters, and other components within the multiplexers 412 (e.g., a Butler matrix), may enable beamforming to increase transmit or receive gain on different boresight angles from the location of the antennas 414a-n.

Figure 5:
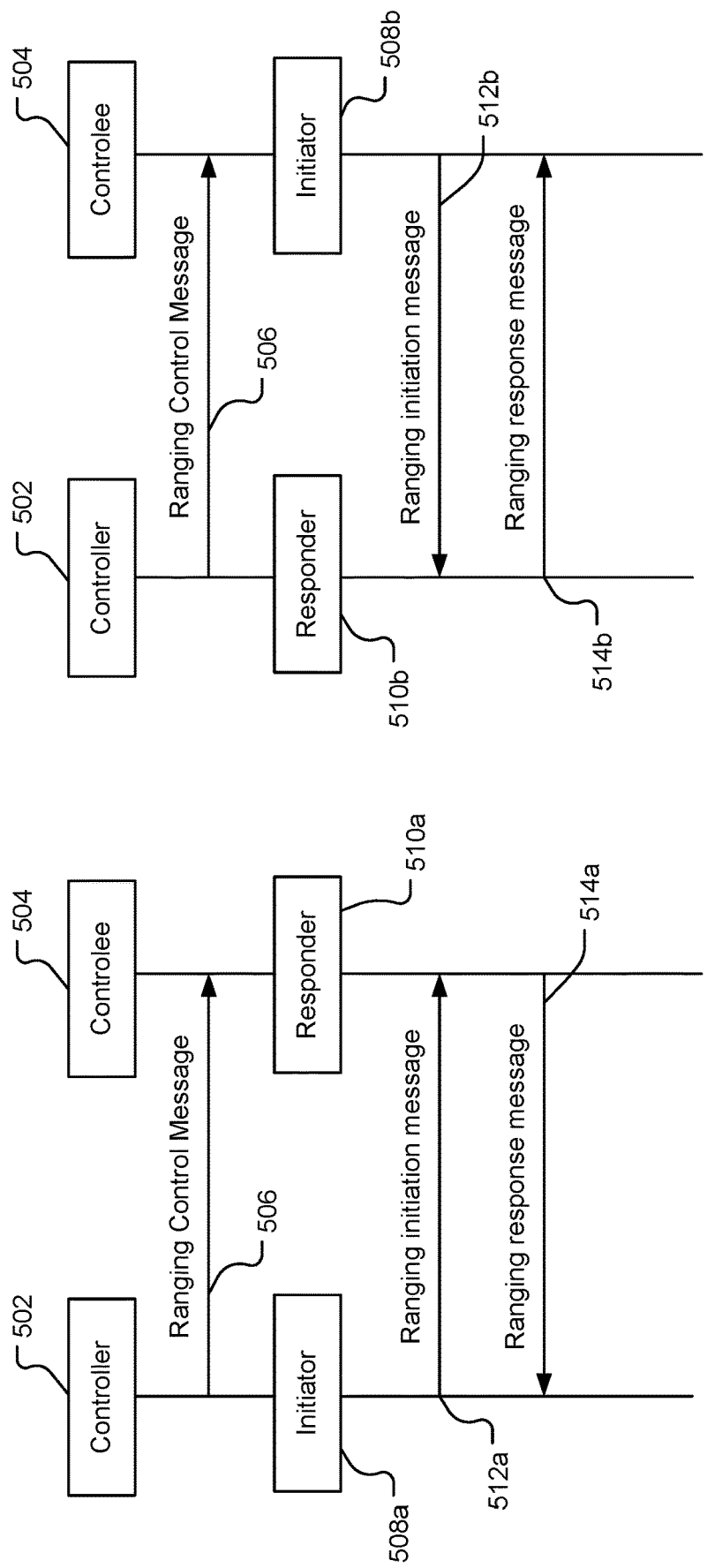
FIGS. 5A and 5B include example message flow diagrams used for Enhanced Ranging Devices (ERDEVs).

Referring to FIGS. 5A and 5B, example message flow diagrams used for Enhanced Ranging Devices (ERDEVs) are shown. Two devices such as the UE 200 and a UWB device 380 may be configured to exchange messages to determine a range (e.g., distance) between one another. In an example automotive use case, a UE 200 may be a smart phone and configured to perform the role of a controller 502 and a UWB device 380 may be in a vehicle and configured to perform the role of a controlee 504. In an example, the UE 200 may be configured to unlock and start the vehicle when within a specified range of the vehicle and the message flow diagrams in FIGS. 5A and 5B may be used to determine the range between the vehicle and the UE. As the controller 502, the UE 200 may establish the parameters for a UWB ranging session and provide the session information to the controlee 504 via one or more Ranging Control Messages (RCMs) 506. The RCM 506 may include ranging parameters, such as channel information, ranging block and slot configurations, to enable the stations to perform a time-scheduled or contention-free UWB ranging session. In an example, biometric associated with the user of the UE may be included in the RCM 506. The controlee 504 may be configured to utilize the ranging parameters received from the controller 502 in the RCM 506. In an example, the controller 502 and the controlee 504 may exchange RCMs 506 to negotiate the session parameters. The concepts of the controller 502 and the controlee 504 are based on an upper layer networking perspective, and roles of an initiator and responder may be used on the physical and medium access control (MAC) layers. Utilizing the ranging parameters included in the RCM 506, an initiator 508a, 508b is configured to initiate a ranging exchange by sending the first message of the exchange, such as a ranging initiation message (RIM) 512a, 512b. As depicted in FIGS. 5A and 5B, either the controller 502 or the controlee 504 may assume the respective roles as the initiator 508a, 508b. Similarly, the controller 502 and the controlee 504 may be configured as the respective responder 510a, 510b and may respond to the respective RIMs 512a, 512b with ranging response messages (RRMs) 514a, 514b. In general, UWB ranging is designed to have a relatively low complexity data structure to enable ranging between relatively low cost devices (e.g., low complexity devices). The ranging sessions may be time division multiple access (TDMA) based with ranging blocks being the primary unit.

Figure 6:
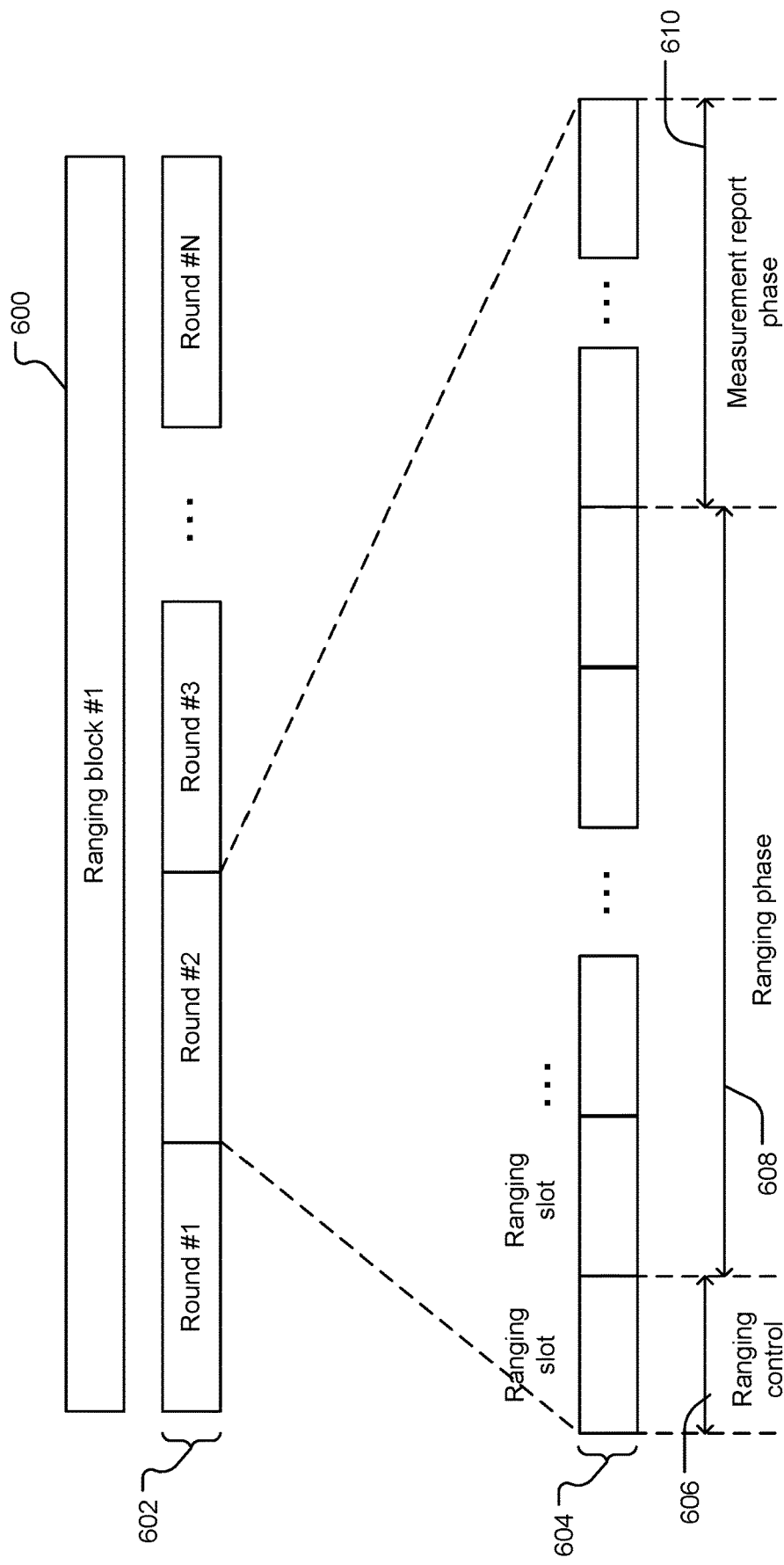
FIG. 6 is a diagram of an example ranging block for use in a UWB ranging session.

Referring to FIG. 6, with further reference to FIGS. 5A and 5B, a diagram of an example ranging block 600 for use in a UWB ranging session is shown. A UWB ranging session between two devices (e.g., a UE 200 and a UWB device 380) may include consecutive ranging blocks 600. Each ranging block 600 includes ranging rounds 602, which are comprised of ranging slots 604. Within a ranging block 600, a responder 510a, 510b may transmit a message within a single ranging round 602 (e.g., round #2). The round index may be statically configured by the controller 502 or selected based on a hopping pattern configured by the controller 502. The slots 604 within a selected ranging round 602 may be used sequentially to perform ranging exchanges and/or to determine TDOA measurements. Each ranging round 602 (e.g., round #2) may include a single ranging control slot 606 followed by ranging phase slots 608 and measurement reporting slots 610. The ranging rounds 602 and ranging slots 604 may be of a fixed duration as established in the RCM 506. In an example, different ranging rounds 602 in sequential ranging blocks 600 may be used to reduce interference caused by UWB ranging sessions between other proximate stations. In an example, a ranging block 600 may be approximately 250 milliseconds (ms) in duration and a ranging round 602 may be approximately 10 ms in duration. A default ranging slot 604 duration is approximately 1 ms. Other block, round, and slot durations may also be used. The duration of the ranging slots 604 may vary based on the configuration of the ranging packets. In an example, a ranging packet without a physical layer payload (e.g., STS packet configuration three) may be approximately 150 microsecond (µs) in duration. In general, there is one ranging packet per ranging slot 604, and multiple ranging packets may be exchanged between the initiator and responder in respective ranging phase slots 608.

Figure 7:
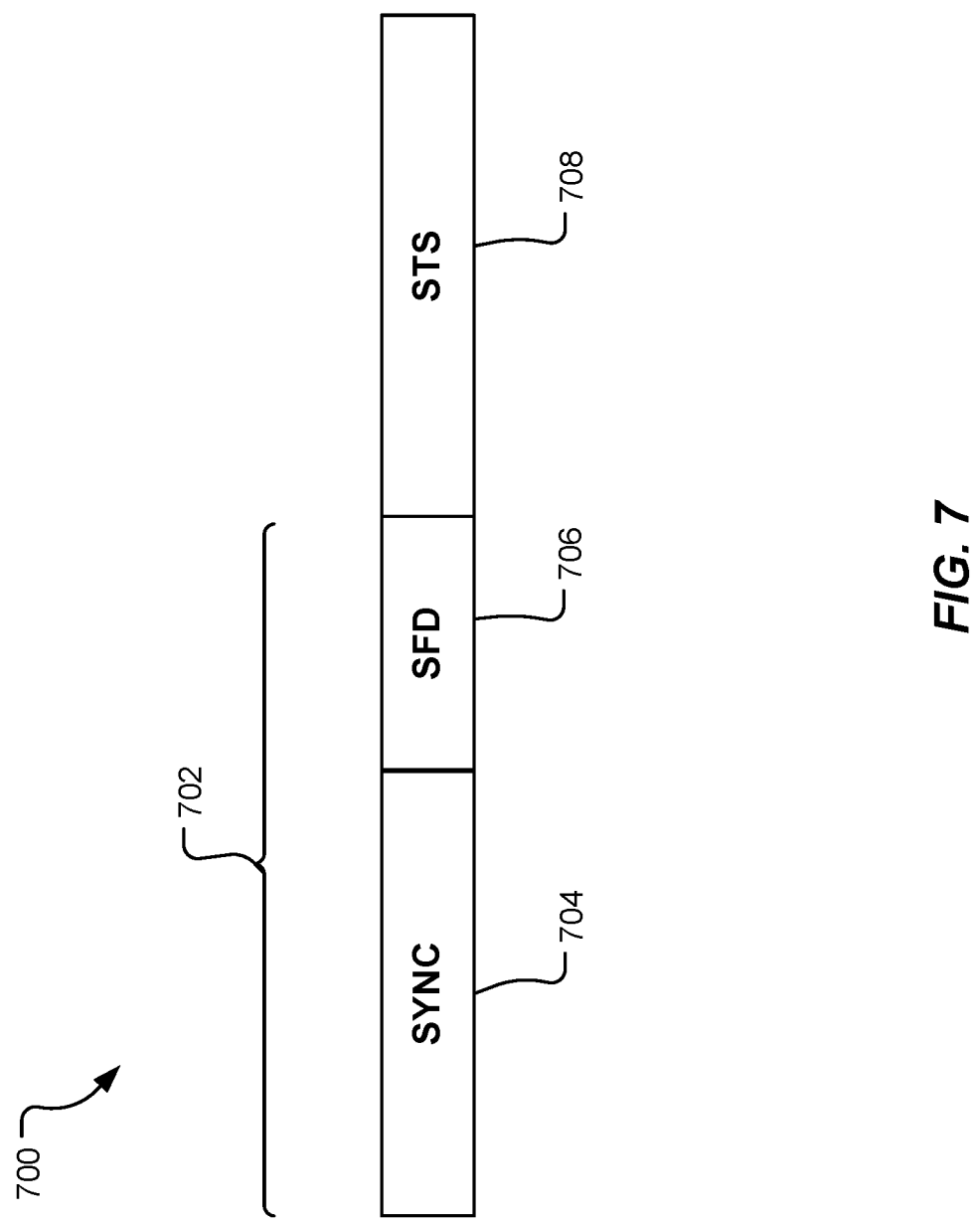
FIG. 7 is a diagram of an example physical protocol data unit (PPDU) frame configuration incorporating a sync preamble for ranging.
Figure 10:
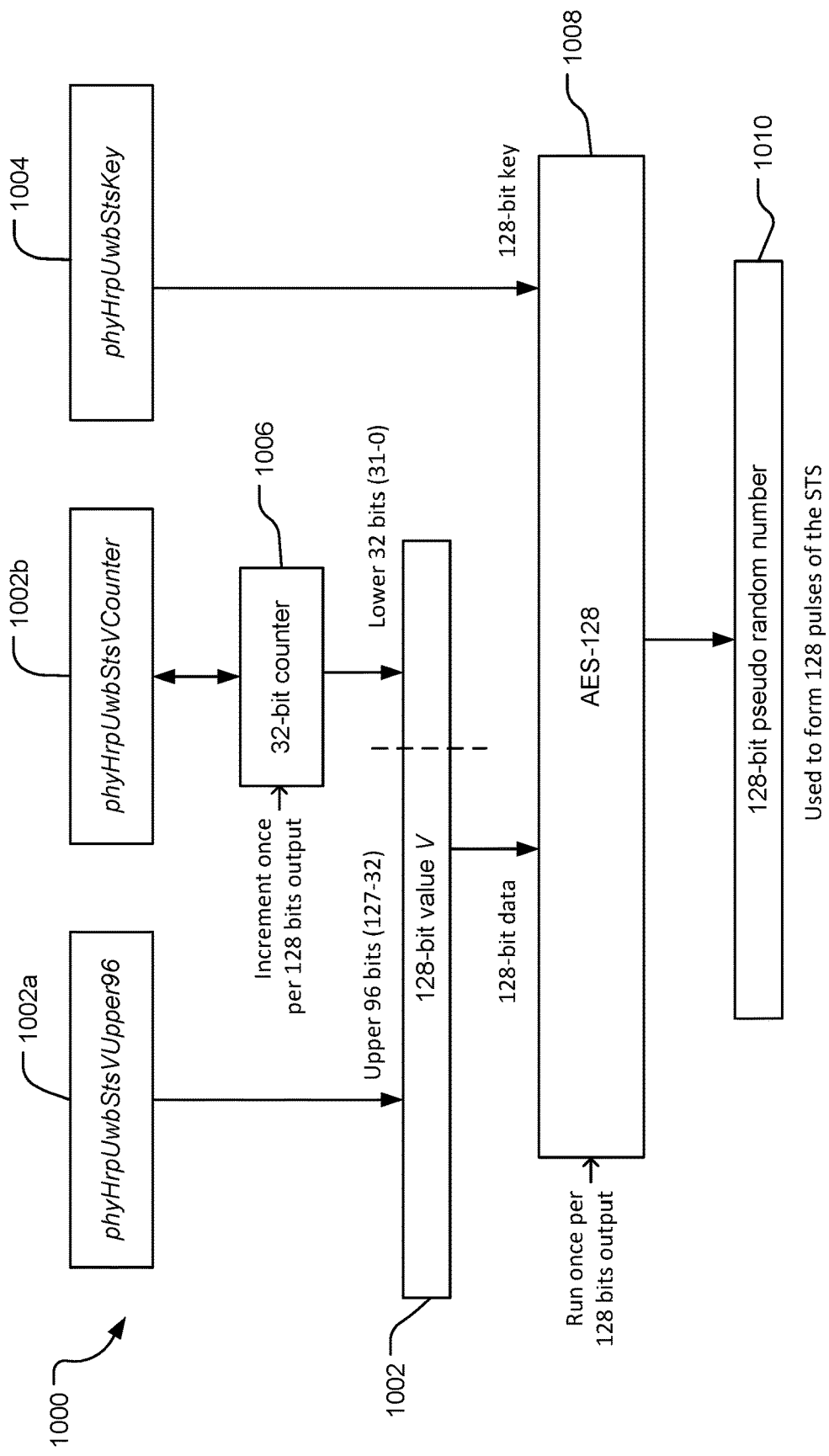
FIG. 10 is a block diagram of a process for generating a pseudo random number based on the Advanced Encryption Standard (AES).

Referring to FIG. 7, an example physical protocol data unit (PPDU) frame 700 incorporating a sync preamble for ranging is shown. A UWB ranging session may utilize packet formats based on the PPDU frame 700. The PPDU frame 700 is an example, and not a limitation, as other data structures may include a sync preamble for ranging. In an effort to reduce the chances of an external attack, secure ranging protocols may encrypt the physical layer (PHY) timestamp sequence using the AES-128 encryption algorithm. The PPDU frame 700 may include a synchronization header (SHR) 702, which includes a synchronization (SYNC) field 704 and a start of frame delimiter (SFD) 706. The SYNC field 704 (also referred to as a preamble sequence) includes a predetermined sequence (such as an Ipatov ternary sequence) configured to improve autocorrelation properties. The SYNC field 704 (i.e., the preamble sequence) may be susceptible to over-the-air attacks because an attacker may anticipate that a known sequence is being utilized. A ciphered sequence, such as a scrambled timestamp sequence (STS) 708 may be used to increase the integrity and accuracy of ranging measurements. The STS 708 may include sequences of pseudo-randomized pulses generated using a Deterministic Random Bit Generator (DRBG) based on the Advanced Encryption Standard (AES), such as depicted in FIG. 10. The SFD 706 is configured to help demarcate the SYNC field 704 from the STS 708. The STS 708 may be encrypted using the AES-128 algorithm and a ToA estimate may be based on decoding the STS 708. In an example, a range measurement may be validated if the received STS 708 may be cross correlated with a locally generated reference. A receiving station may be configured to locally generate a secure sequence based on the same key information used by a transmitting station to generate the STS 708. For example, the STS key and V values utilized in the AES algorithm may be provided to a receiving station via an out-of-band transmission, and both the transmitting and receiving stations may be configured to generate the STS 708. The PPDU frame 700 is an example of a STS packet configuration three and does not include a data payload. In an example, other STS packet configurations (e.g., zero, one, and two) may also be used for UWB ranging sessions.

Figure 8A:
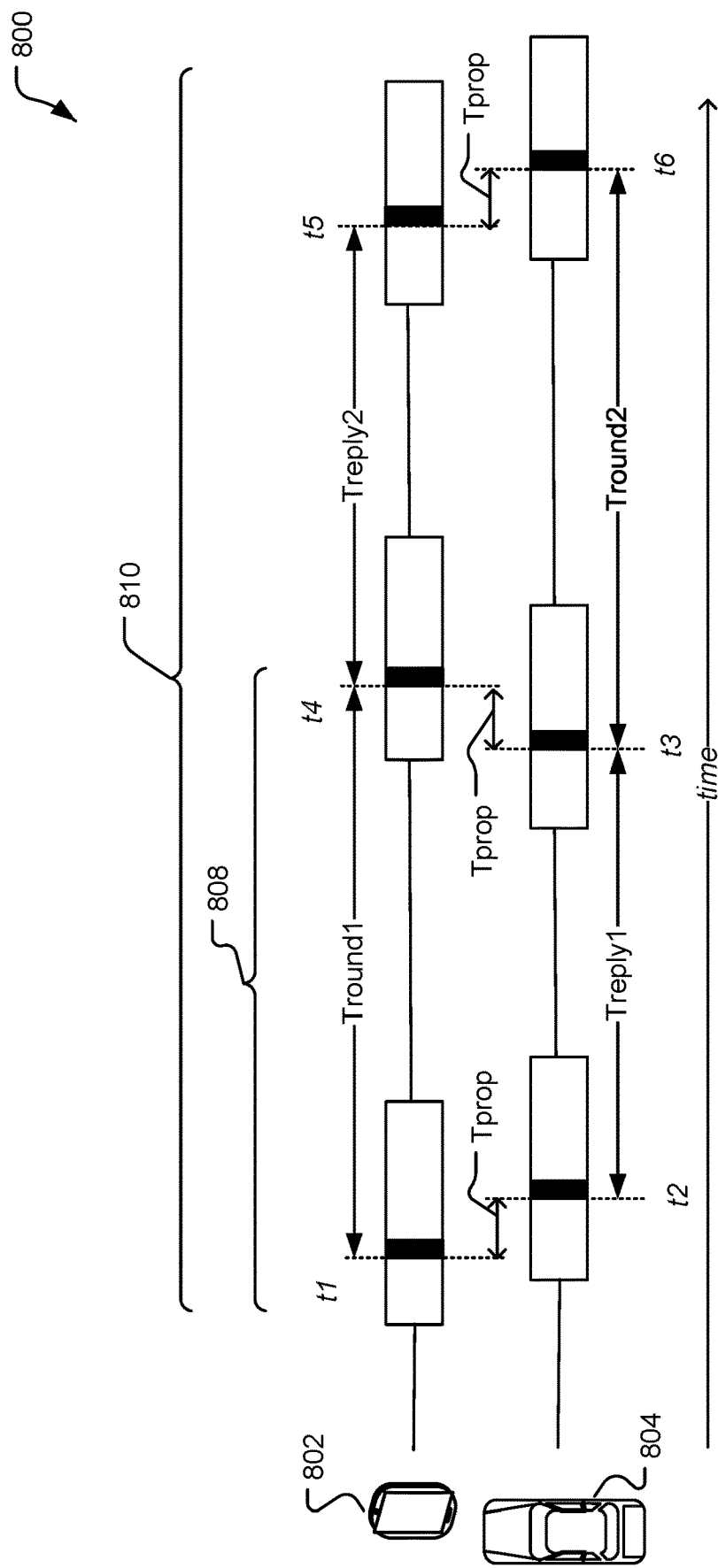
FIG. 8A is a diagram of example signal exchanges for UWB ranging.

Referring to FIG. 8A, a diagram 800 of example signal exchanges for UWB ranging is shown. The diagram 800 includes a first UWB device 802 (e.g., a smartphone) and a second UWB device 804 (e.g., a vehicle). The UWB devices 802, 804 may include some or all of the components of the UE 200 and/or the UWB device 380. The UE 200 is an example of the first UWB device, and the UWB device 380 is an example of the second UWB device 804. Each of the UWB devices 802, 804 includes one or more transceivers configured to send and receive UWB signals, such as depicted in the communications module 402. The signal exchanges may be based in the IEEE 802.15.4 standard and may utilize the physical layer (PHY) and media access control (MAC) sublayers to enable secure ranging. The positioning exchanges may also utilize IEEE 802.15.4z security features such as STS 708 in the UWB ranging frame to prevent preamble insertion attacks. In a first example, the UWB signals comprise a single-sided two-way ranging exchange 808 such that the first UWB device 802 transmits a ranging marker at time t1 which is received by the second UWB device 804 at time t2. The second UWB device 804 may send an acknowledgement frame at time t3, which is received by the first UWB device at time t4. A first round time (Tround1) is equal to t4-t1, and a first reply time (Treply1) is equal to t3-t1. The second UWB device 804 may be configured to provide the Treply1 time to the first UWB device 802. The first UWB device 802 may compute a first round trip propagation time:

$$Tprop1 = Tround1 - Treply1 \quad (1)$$

The distance between the first UWB device 802 and the second UWB device 804 is equal to:

$$distance = c * (Tprop1/2) \quad (2)$$

where c=the speed of light.

In a second example, the signals comprise a double-sided two-way ranging exchange 810 such that the first UWB device 802 will also transmit an acknowledgment at time t5 which is received by the second UWB device 804 at time t6. The first UWB device 802 may provide a second reply time (Treply2) (i.e., t5-t4) to the second UWB device 804. The Tprop time may be computed as:

$$Tprop = ((Tround1 * Tround2) - (Treply1 * Treply2))/ \quad (3)$$
$$(Tround1 + Tround2 - Treply1 - Treply2)$$

The propagation times (i.e., Tprop) represent the time-of-flight (ToF) of the respective signals between the UWB devices 802, 804 and may be used to determine the distance between the UWB devices 802, 804. In operation, a UWB device may be configured to determine distances up to 100 m with an accuracy of approximately +/−10 cm.

Figure 8B:
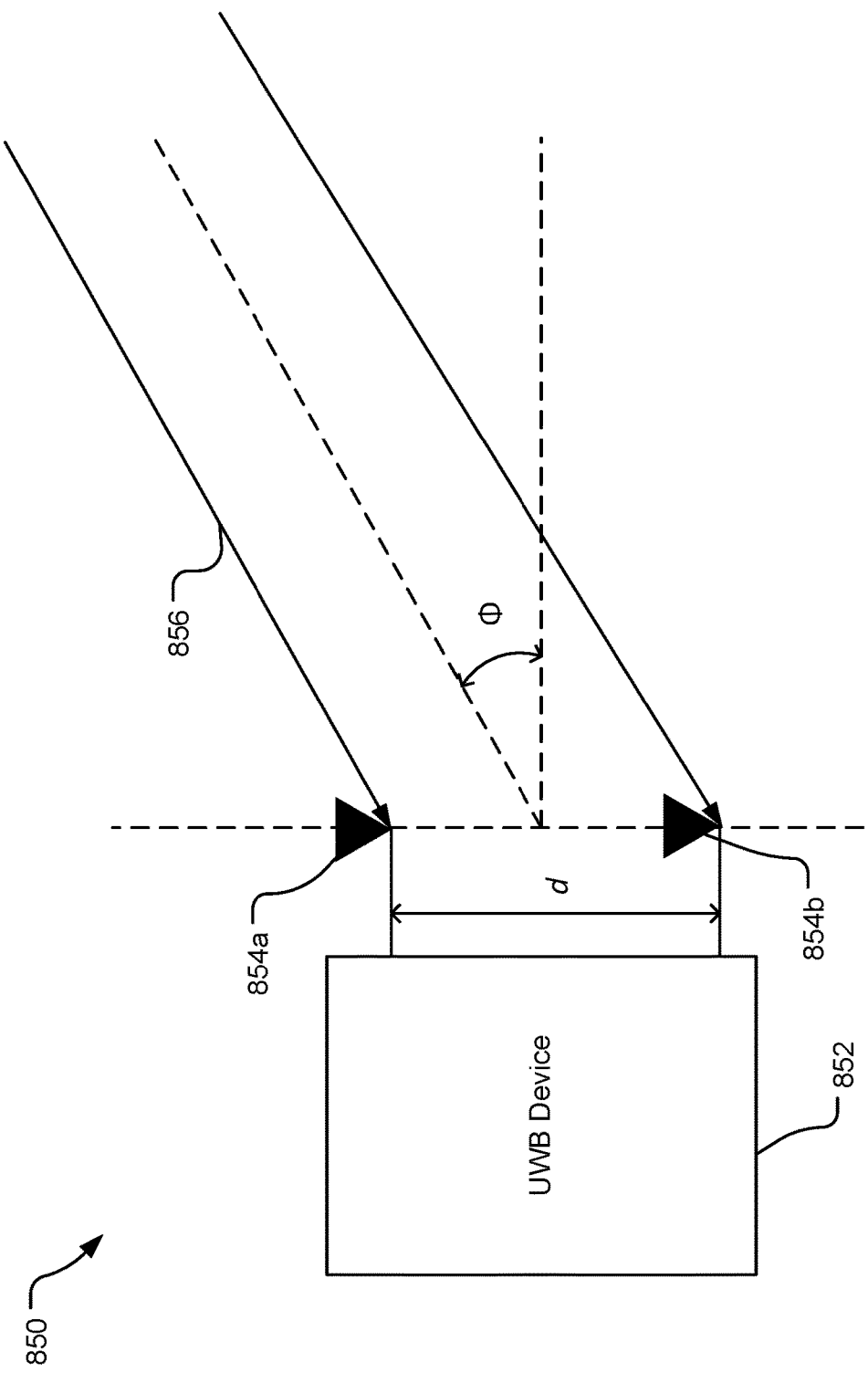
FIG. 8B is a diagram of an example angle of arrival of a UWB signal.

Referring to FIG. 8B, a diagram 850 of an example angle of arrival of a UWB signal is shown. The diagram 850 includes a UWB device 852 (e.g., the first UWB device 802 or the second UWB device 804) with a plurality of antennas 854a, 854b in an antenna array. A UWB signal 856 is detected at an angle of arrival (AoA) Φ by the antenna array. In general, the AoA is based on a time difference between the arrival of the UWB signal 856 at each of the antennas 854a, 854b in the antenna array. The time delay between the arrival of the signals may be determined as:

$$t = d * \sin\Phi/c \quad (4)$$

where,
t is the time delay;
d is the distance between the antennas;
Φ is the AoA; and
c is the speed of light.

In operation, the UWB device may be configured to determine an AoA with an accuracy of approximately +/−1.5 degrees. Other radio technologies and transceiver/antenna configurations may realize different accuracy results.

Figure 9:
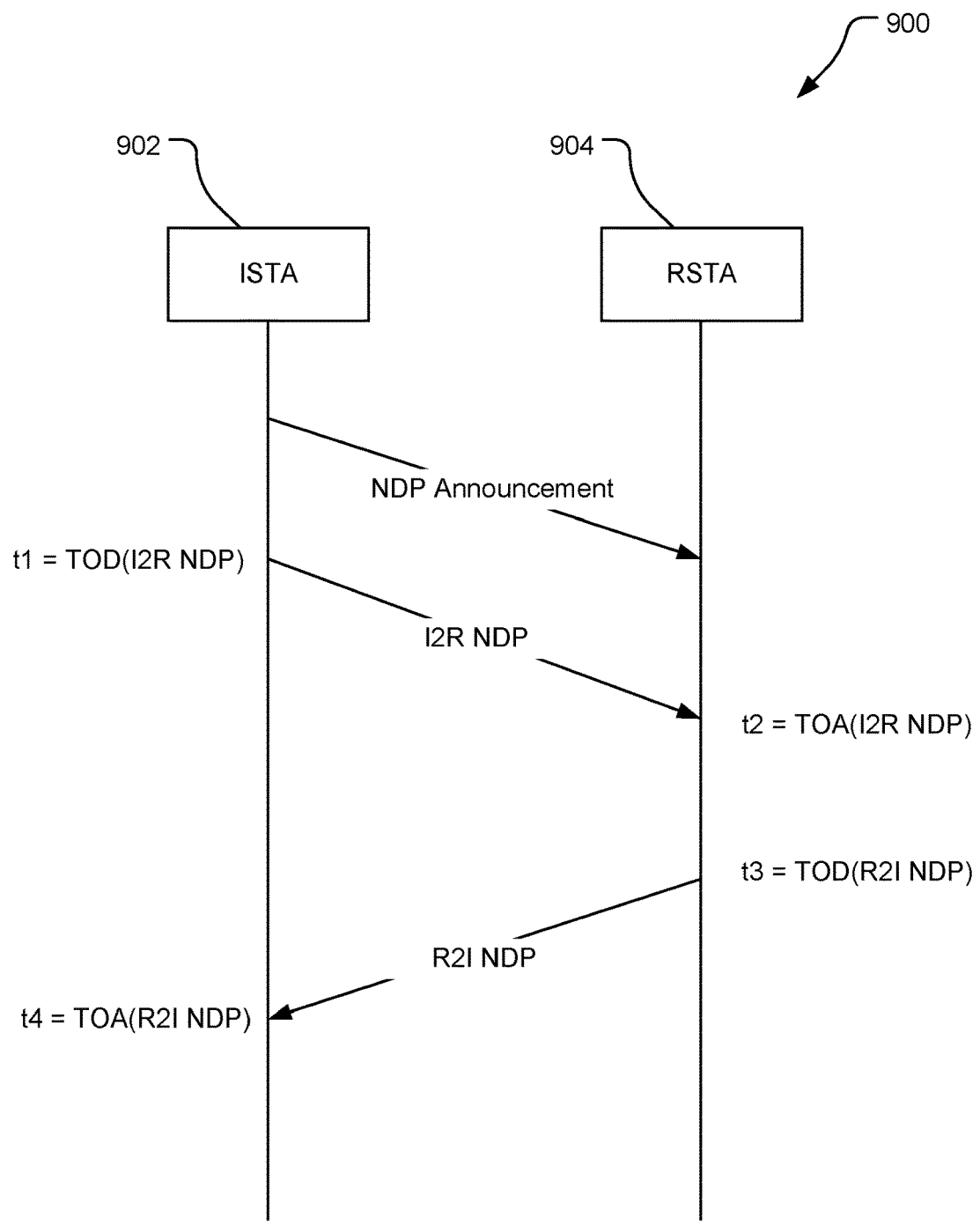
FIG. 9 is a message flow diagram of an example ranging session in WiFi.

Referring to FIG. 9, a message flow diagram 900 of an example ranging session in WiFi is shown. The diagram 900 includes an initiating station 902 and a responding station 904 configured to exchange ranging messages. Each of the stations 902, 904 may include some or all of the components of the UE 200 and the AP 300, and the UE 200 and the AP 300 are examples of either one or both of the stations 902, 904. In a use case, the initiating station 902 is a UE, key fob, IoT device, etc., and the responding station 904 is an AP 300. The signal exchange in the diagram 900 may comply with industry standards such as IEEE 802.11ax/az. In a non-trigger based ranging session, the stations may initiate the session using carrier-sense multiple access with collision avoidance (CSMA/CA). The stations 902, 904 may send and receive ranging frames such as null data packets (NDP) including a preamble and physical layer information (e.g., headers, payloads). After a NDP announcement frame is transmitted successfully, the stations may transmit subsequent NDPs within the shortest interframe spacing (SIFS) to retain the channel. In an example, the biometric information and other secure sequences described herein may be included in the physical layer payloads.

Referring to FIG. 10, a block diagram of a process 1000 for generating a pseudo random number based on the AES standard is shown. The resulting pseudo random number may be used as a STS for ranging as described in the IEEE 802.15.4z standard. The process 1000 utilizes a block size of 128 bits, but other sizes may also be used (e.g., 192, 256 bits). An STS consists of a sequence of pseudo randomized pulses generated by a Deterministic Random Bit Generator (DRBG) based on AES-128 in counter mode, such as the process 1000. Each time the DRBG is run, it produces a 128-bit pseudo random number used for the STS. The process 1000 provides a 128-bit value V 1002 and a 128-bit key 1004 to the AES-128 algorithm 1008. The value V 1002 may include an upper 96 bits 1002a and a 32 bit counter 1002b which may be incremented once per 128-bits of output at stage 1006. The output of the AES-128 algorithm 1008 is a 128-bit pseudo random number 1010 which is used to form the STS. In operation, a transmitting station and a receiving station may receive V and key values (including the counter configuration) via a secure means and each station may generate the same 128-bit pseudo random number 1010 based on those inputs. The receiving station may correlate the locally generated STS with the STS received from the transmitting station.

Figure 11:
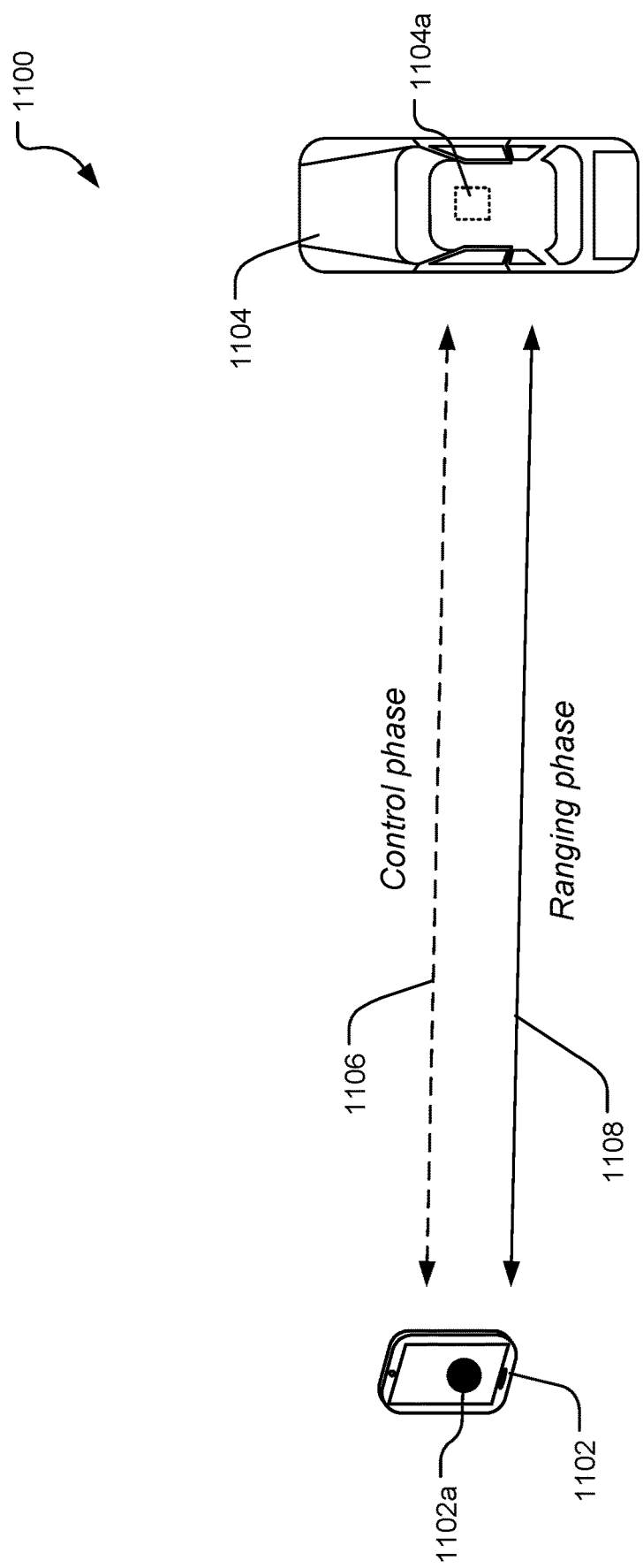
FIG. 11 is a diagram of example signal exchanges for ranging with biometric information.

Referring to FIG. 11, a diagram 1100 of example signal exchanges for ranging with biometric information is shown. In general, many mobile devices such as smartphones and other UWB-capable devices may also be able to obtain biometric information associated with a user (e.g., fingerprint, facial features, voice etc.). As described in the use cases herein, such biometric information may be used to enhance security during a ranging session, to improve context awareness, and increase position accuracy and classification schemes. Although the use cases presented herein utilize UWB technologies, the concepts may be extended to other wireless technologies as well, such as WiFi or NR-Sidelink. The use case in diagram 1100 is directed to an access control procedure for unlocking and accessing a vehicle (or other restricted area). In an example, a UWB ranging procedure may include a UE 1102 (e.g., a smartphone) as a controller 502, and a vehicle 1104 as a controlee 504. The vehicle 1104 may include an onboard control system 1104a including some or all of the components of an access point 300 and/or a UWB device 380.

In prior systems, a malicious user may simply obtain and then use an authentic device (e.g., a digital key) to access a vehicle. In the techniques provided herein, a biometric signature of the authentic user may also be requested to enhance security. The biometric signature may be based on biometric information 1102a obtained by one or more sensors in the UE 1102 and stored in a local memory (e.g., memory 211). The biometric information 1102a may include biological data (e.g., fingerprint, face, iris, etc.) or other behavioral data (e.g., keystroke dynamics, gait, signature, voice, etc.) that is available on the UE 1102. The biometric information 1102a may be provided via an out-of-band (OOB) communication and/or included in the payload(s) of one or more ranging messages transmitted from the user's device. The biometric information 1102a may be provided during session setup with other cryptographic information such as the V and key values described in FIG. 10. In an example, in a session setup procedure, one or more control phase messages 1106 may be exchanged between the UE 1102 and the vehicle 1104. In a UWB session, the control phase messages 1106 may be configured over OOB communication, such as Bluetooth. The controller (e.g., UE 1102) and the controlee (e.g., vehicle 1104) may exchange authentication information, which in turn may be used by an authenticating system (e.g., vehicle onboard control system 1104a) to validate a certificate. In an example, the biometric information 1102a may be used as (or a part of) a certificate to authenticate the UWB session. The UE 1102 and the vehicle 1104 may exchange ranging packets (e.g., PPDU frames) as ranging phase messages 1108. In an example, the one or more packets may be exchanged during the ranging phase messages 1108. For example, the PPDU frame may include a data payload element and the biometric information 1102a may be included as the payload. The inclusion of the biometric information 1102a, in the control phase messages 1106 and/or the ranging phase messages 1108, may provide additional security since a malicious user will not be able to procure biometric data even if the malicious user obtains access to the digital key. The authentication using biometric information 1102a may be enabled at the upper-layers via an application, while the underlying ranging/positioning may employ other wireless technologies.

Figure 12:
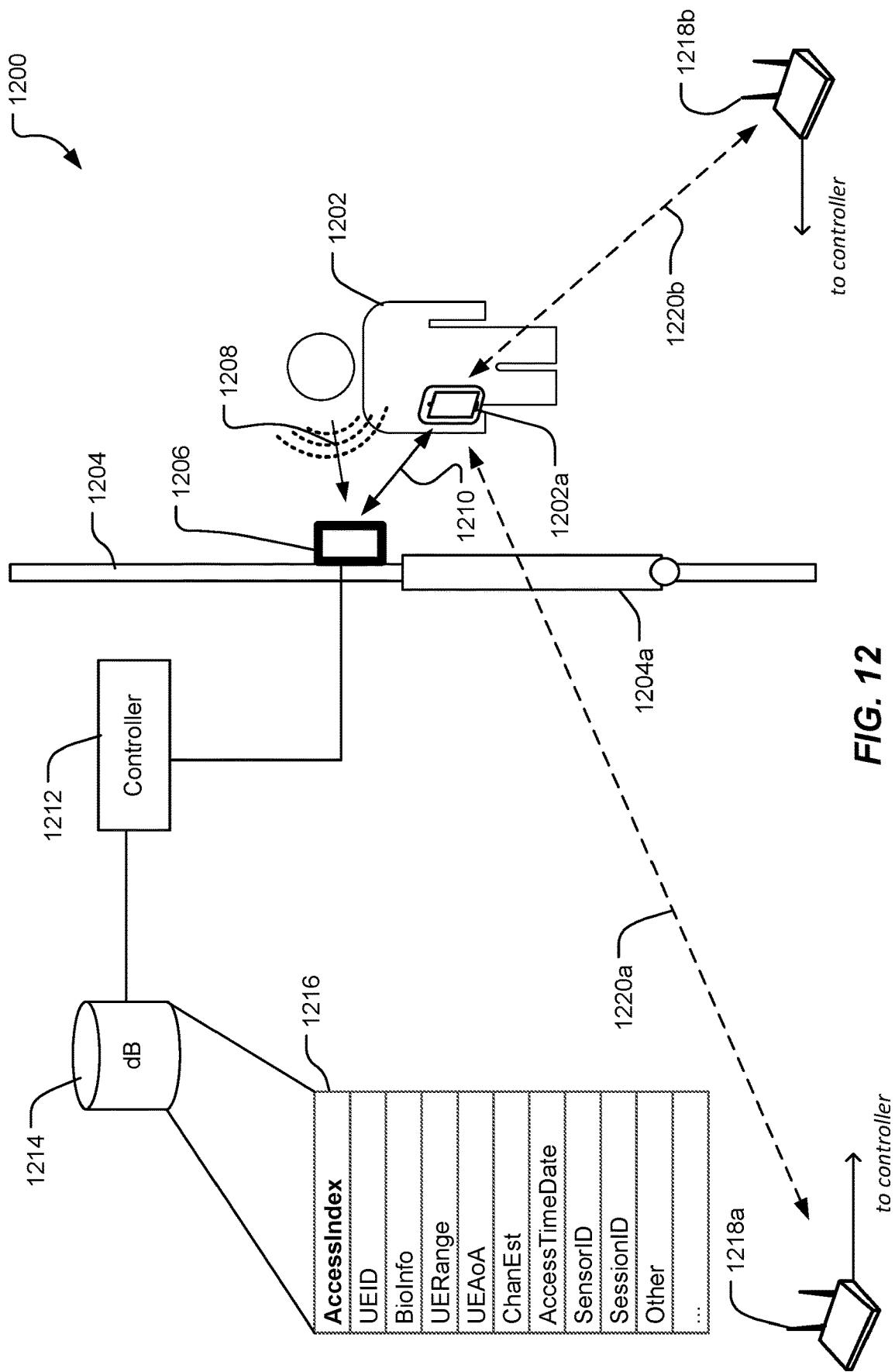
FIG. 12 is a diagram of an example point of access use case including biometric sensors and ranging signals.

Referring to FIG. 12, a diagram 1200 of an example point of access use case including biometric sensors and ranging signals are shown. The use case in diagram 1200 obtains biometric information at a point of access such as a door of a building or vehicle. The point of access may include one or more biometric sensors such as a fingerprint scanner, optical scanners (e.g., cameras), and/or microphones, etc. For example, in a secure building use case, a user 1202 may enter a building 1204 with a secure access point such as a door 1204a is configured to open when the user 1202 provides biometric authentication. One or more biometric sensors 1206 may be configured to receive a biometric input, such as a voice input 1208 from the user 1202. At the time the user 1202 provides the biometric input (e.g., the voice input 1208), the biometric sensor 1206, or one or more proximate wireless devices 1218a, 1218b, may be configured to perform a ranging exchange 1210, 1220a, 1220b, with a UE 1202a that is associated with the user 1202. The biometric sensor 1206, and other wireless devices 1218a, 1218b, may be communicatively coupled to a controller 1212 and configured to provide biometric information and range measurements to the controller 1212. The controller 1212 may include some or all of the components of an access point 300, and the access point 300 is an example of the controller 1212. In an example, the controller 1212 may be a server or other computing platform including a processor, memory and associated peripheral devices. The controller 1212 may include or be communicatively coupled to a data structure 1214, such as a database including one or more tables 1216 to store access event information. The data structure 1214 may include relational database applications (e.g., Oracle, SQL, dBase, etc.), flat files (e.g., JSON, XML, CVS), binary files, or other file structures configured to persist and index information associated with access events. The data structure 1214 may include other instructions such as stored procedures configured to query, update, append and index the one or more tables 1216. The one or more tables 1216 may include data fields based on biometric information and ranging signals acquired at the point of access (e.g., the biometric sensors 1206 near the door 1204a). For example, a UE ID field may include information to identify the UE 1202a that is associated with the user 1202. A BioInfo field may include extracted features of the biometric information obtained by the biometric sensor 1206 (e.g., fingerprint, voice input 1208, iris information, etc.). UERange and UEAoA fields may include measurements based on the ranging exchange 1210. Other fields associated with ranging exchanges between the UE 1202a and the other wireless devices 1218a, 1218b may also be included in the one or more tables 1216. A ChanEst field may include parameters associated with the RF channel that was used for the ranging exchange(s). An AccessTimeDate field may include temporal information associated with obtaining the biometric input from the user 1202. SensorID fields may include parameters associated with biometric sensors 1206 that obtained the biometric input. A SessionID field may be unique identifying information, such as the MAC address of the device, or another parameter that is exchanged over the application at the upper layers to associate the ranging session. These fields are examples, and not limitations, as other fields and tables may be used to store information associated with point of access events.

In operation, the controller 1212 may be configured to obtain and store parameters (e.g., based on the one or more tables 1216) associated with the access events. Over time, the controller 1212 may be configured to determine a correlation between the biometric information acquired by the biometric sensors 1206 and the ranging information determined at the time the biometric information is obtained. In an example, a unique mapping may be formed between such a ranging session and the biometric information. Based on this unique mapping, the controller 1212 may enable future access for the user 1202 based on the ranging session without obtaining the biometric input. For example, in a use case, the user 1202 may utilize UWB ranging to gain access through the door 1204a. Initially, the controller 1212 may require biometric information (e.g., the voice input 1208) to enable access. Over time, a unique mapping is established between the ranging session and the biometric signature. Once a mapping is formed, the user 1202 would not be required to provide biometric information and the controller 1212 may be configured to grant access based on the UWB ranging measurements.

In an example, the mapping use case of FIG. 12 may be combined with the exchange of biometric information as described in FIG. 11. The user 1202 may provide a biometric input (e.g., the voice input 1208) at the point of access (e.g., to the biometric sensor 1206) and the ranging exchange 1210 may include biometric information in the control phase messages 1106 and/or the ranging phase messages 1108. For example, biometric input stored in the UE 1202a that is associated with the user 1202 (e.g., a finger print scan received by the UE 1202a, gait information computed by the UE 1202a, finger swipe recognition obtained by the UE 1202a, etc.) may be provided during the ranging exchange 1210 and stored in the data structure 1214 to be included in the mapping. The biometric information stored on the UE may be evaluated based on the time of input to the UE 1202a to exclude stale information (e.g., inputs that are older than 1, 5, 10, 30, 60 mins, etc.). In operation, the user 1202 may be granted access based on biometric information obtained by the UE 1202a, and provided to the controller 1212 during the ranging exchange 1210, without requiring the user 1202 to provide a biometric input to the biometric sensor 1206.

In an example, since the user 1202 will be proximate to the biometric sensor 1206 when providing a biometric input, the ranging measurements obtained by wireless devices (e.g., the biometric sensor 1206, and the wireless devices 1218a, 1218b) may be acquired and associated with the precise point of access. The ranging measurements may include channel estimates, Time of Arrival (ToA) and Angle of Arrival (AoA) estimates, and other signals used for positioning the UE 1202a. Comparing the position estimate acquired from the saved ranging measurements (e.g., as saved in the data structure 1214) and the ground truth (i.e., when the door is accessed), may assist in determining errors in the original position estimates. In a vehicle use case, a single vehicle may have multiple responder devices disposed in various locations around the vehicle. Position estimates for an approaching user/UE may be determined based on ranging exchanges with the responder devices. A controller in the vehicle (e.g., a positioning engine) may be configured to improve future position estimates based on the measurements when the user provides a biometric input at a known location on the vehicle (e.g., palm print on the vehicle door, etc.). Machine learning techniques, or other statistical or filtering (e.g., Kalman filter) approaches may be used to improve the future estimates based on the ranging estimates. The vehicle controller may be configured to utilize the improved position estimates to predict which door of the vehicle the user is likely to access as the user approaches (e.g., based on machine learning classifications). A controller, in a vehicle or other structure, may be configured to obtain and store measurements based on ranging exchanges along with ground truth information (i.e., obtained from the point where biometric information is acquired), and improve future position estimates or perform classification to preemptively determine the point of entry (e.g., a location of a vehicle or building the user is most likely approaching).

In an example, the controller 1212, biometric sensor 1206 or other wireless devices 1218a, 1218b, may be configured to provide the biometric information received from the user 1202 back to the user's mobile device (e.g., the UE 1202a) via a wireless signal. The biometric information on the mobile device may be used to improve context awareness for subsequent processes. For example, in a vehicle use case, after a vehicle has been unlocked based on receiving the user's biometric data (from a biometric sensor on the vehicle), the biometric information can be used to determine whether the user entered the driver's seat or another seat. Additional actions may be triggered based on this knowledge, such as starting the vehicle (when the user is in the driver's seat), or requiring authorization from the user to allow another user to start the car. Other context based operations may utilize the biometric information that was obtained from a biometric sensor and then provided to the user's mobile device.

Figure 13:
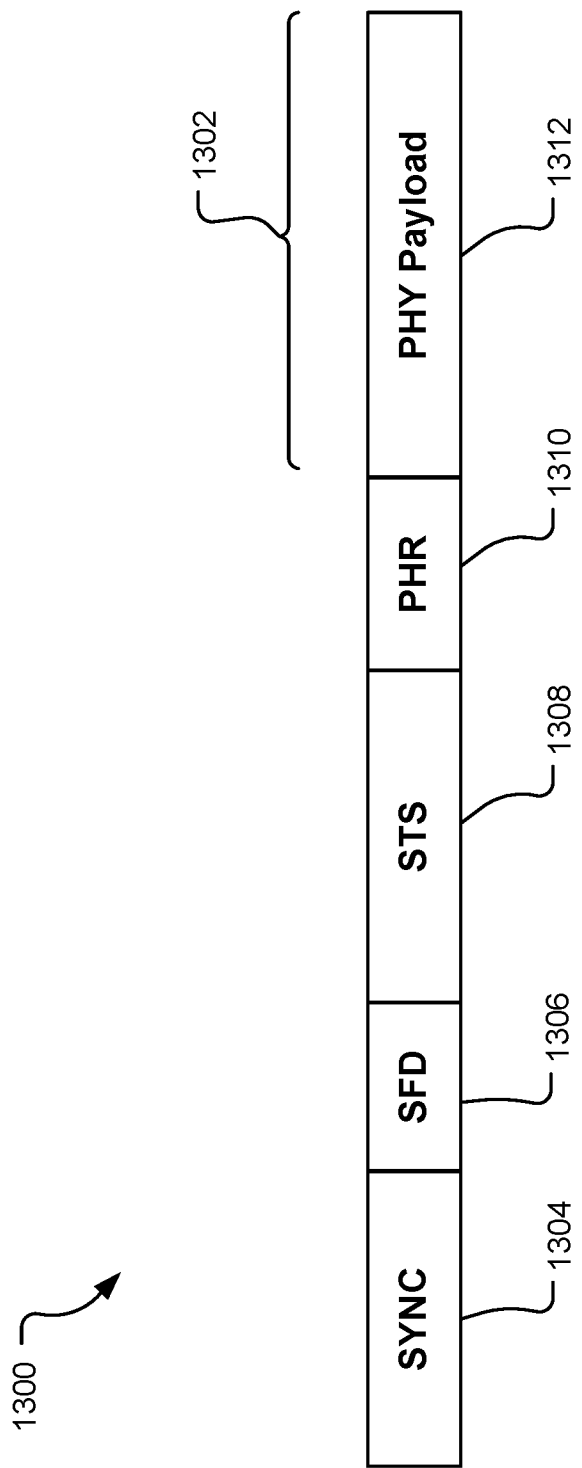
FIG. 13 is an example packet configuration for UWB ranging with biometric information.

Referring to FIG. 13, an example packet configuration for UWB ranging with biometric information is shown. In an example, a single UWB frame 1300 may be jointly used for ranging and for authentication and may include biometric information 1302. The UWB frame 1300 may be a PPDU frame including a synchronization (SYNC) field 1304 and a start of frame delimiter (SFD) 1306. The SYNC field 1304 (also referred to as a preamble sequence) includes a predetermined sequence (such as an Ipatov ternary sequence) configured to improve autocorrelation properties. A ciphered sequence, such as a scrambled timestamp sequence (STS) 1308 may be used to increase the integrity and accuracy of ranging measurements. The STS 1308 may include sequences of pseudo-randomized pulses generated using DRBG based on the AES, such as depicted in FIG. 10. The SFD 1306 is configured to help demarcate the SYNC field 704 from the STS 1308. The SYNC field 1304 and the STS 1308 may be used for channel estimation and ranging. In an example, the STS 1308 may be encrypted using the AES-128 algorithm and a ToA estimate may be based on decoding the STS 1308. A range measurement may be validated if the received STS 1308 may be cross correlated with a locally generated reference. A receiving station may be configured to locally generate a secure sequence based on the same key information used by a transmitting station to generate the STS 1308. For example, the STS key and V values utilized in the AES algorithm may be provided to a receiving station via an out-of-band transmission (e.g., the control phase messages 1106), and both the transmitting and receiving stations may be configured to generate the STS 1308. A physical layer header (PHR) 1310 may contain information about the PHY Payload 1312, such as the length of the data and the data rate used to transmit the data. The PHY Payload 1312 may include the biometric signature information as described herein. The biometric information 1302 may be used as an integrity check against potential ranging attacks. A malicious transmission will not be able to reproduce the biometric information contained within the PHY Payload 1312. The wireless device receiving the UWB frame 1300 may be configured to decode the payload and perform an integrity check. If the authentic biometric information is present, then the UWB frame 1300 is considered as authentic and is used for ranging/positioning. If invalid information is present, then the UWB frame 1300 is considered to be malicious and is discarded.

Figure 14:
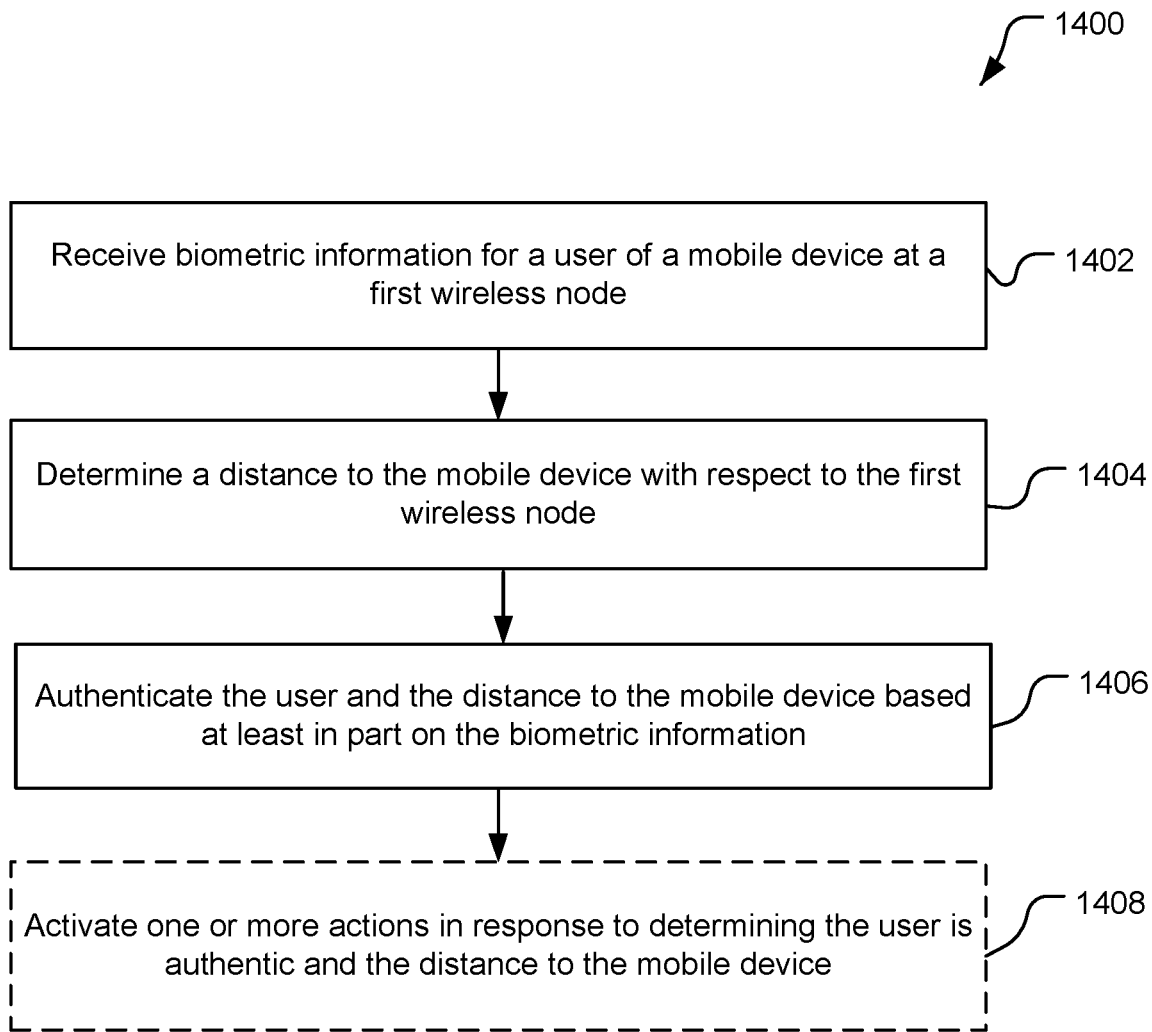
FIG. 14 is an example process flow for authenticating a user utilizing ranging and biometric information.

Referring to FIG. 14, with further reference to FIGS. 1-13, a method 1400 for authenticating a user utilizing ranging and biometric information includes the stages shown. The method 1400 is, however, an example and not limiting. The method 1400 may be altered, e.g., by having stages added, removed, rearranged, combined, performed concurrently, and/or having single stages split into multiple stages. For example, receiving biometric information at stage 1402 and determining a distance to a mobile device at stage 1404 may be performed in a single stage. Activating one or more controls at stage 1408 is optional. The method 1400 may be performed by a controlee 504 in a UWB ranging session. The controlee 504 may be a UE 200, an access point 300, a UWB device 380, or other wireless node configured to utilize wireless ranging procedures.

At stage 1402, the method includes receiving biometric information for a user of a mobile device with a first wireless node. A controlee 504, including a processor 381 and a wireless transceiver 385, is a means for receiving the biometric information and an example of the first wireless node. In an example, referring to FIG. 11, the biometric information may be obtain by one or more sensors in a mobile device such as the UE 1102 and may be received by the vehicle 1104 via a wireless signal. The biometric information may be provided via an OOB communication and/or included in the payload(s) of one or more ranging messages transmitted from the user's device. For example, the biometric information may be received via control phase messages 1106 (e.g., an OOB signal) and/or via one or more ranging phase messages 1108 (e.g., within the PHY payload 1312). In an example, referring to FIG. 12, the biometric information may be obtained by a local biometric information via a point of access biometric sensor such as the biometric sensor 1206 and received by the controller 1212. The biometric information may be digital representations of biological data (e.g., fingerprint, face, iris, etc.) and/or other behavioral data (e.g., keystroke dynamics, gait, signature, voice, etc.) that may be obtained from the user of the mobile device.

At stage 1404, the method includes determining a distance to the mobile device with respect to the first wireless node. The controlee 504, including the processor 381 and the wireless transceiver 385, is a means for determining the distance to the mobile device. In an example, the onboard control system 1104a in the vehicle 1104 may be configured to utilize ranging phase messages 1108, or other wireless exchanges (e.g., NDP messages for WiFi as described in FIG. 9), to determine the distance to the mobile device. In an example, bearing information (e.g., AoA, AoD) may also be determined. In an example, referring to FIG. 12, the controller 1212 may be configured to receive range and other positioning information associated with the UE 1202a from wireless nodes in a network. For example, the biometric sensor 1206 may include a UWB device 380 configured to exchange ranging messages with the UE 1202a and provide the ranging information to the controller 1212. Other wireless devices 1218a, 1218b may be configure to provide ranging information (including respective distances to the UE 1202a) to the controller 1212.

At stage 1406, the method includes authenticating the user and the distance to the mobile device based at least in part on the biometric information. The controlee 504, including the processor 381 is a means for authenticating the user. The onboard control system 1104a or the controller 1212 may include previously obtained biometric information associated with the user which may be compared to the biometric information obtained at stage 1402 to authenticate the user. In an example, the biometric information may be used as (or a part of) a certificate to authenticate a UWB session. In an example, PPDU frames may be received at stage 1404 and may include a data payload element including the biometric information. The inclusion of the biometric information in the control phase messages 1106 and/or the ranging phase messages 1108, may provide additional security since a malicious user will not be able to procure biometric data even if the malicious user obtains access to the digital key. The authentication using biometric information may be enabled at the upper-layers via an application, and the underlying distance determination may utilize other wireless technologies.

At stage 1408, the method optionally includes activating one or more actions in response to determining the user is authentic and the distance to the mobile device. The controlee 504, including the processor 381 is a means for activating the one or more actions. In a vehicle use case, the one or more actions controls may include activating an engine ignition system, or motor activation sequence in response to authenticating the user and determining that the distance is within a threshold value (e.g., 1 m, 2 m, 5 m, 10 m, etc.). Other actions or controls may include unlocking a door, adjusting an environment for the user (e.g., seat position, rear view mirror orientation, radio settings, etc.). In a building access use case, the actions may include opening a door, adjusting the lights in a room, setting climate controls, etc. Other actions or controls that may be adjusted based on a user's preference may also be activated based on the biometric authentication and the distance to the user.

Figure 15:
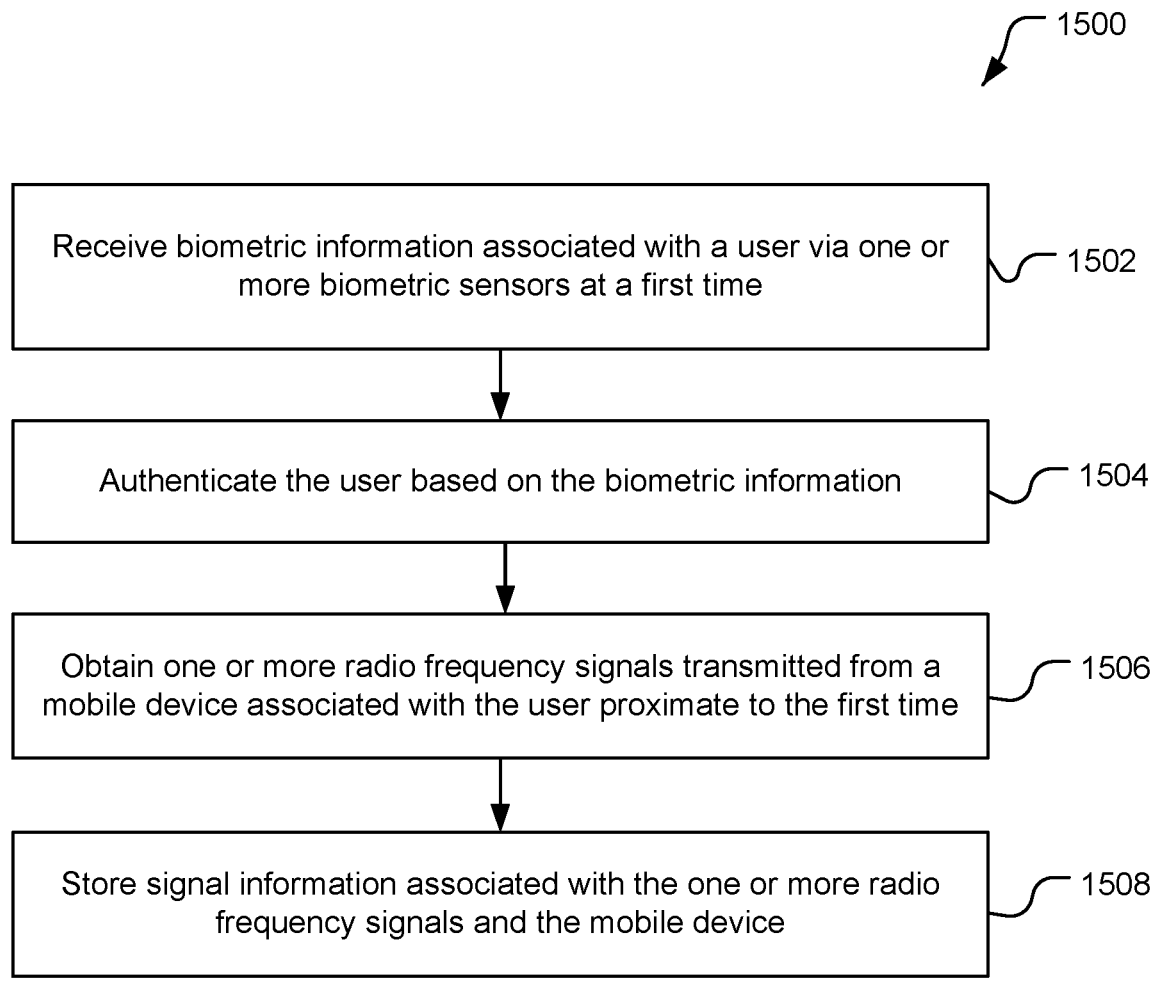
FIG. 15 is an example process flow for mapping between biometric information and a ranging session.

Referring to FIG. 15, with further reference to FIGS. 1-13, a method 1500 for mapping between biometric information and a ranging session includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving biometric information associated with a user via one or more biometric sensors at a first time. A controller 1212, including a processor 310 and a transceiver 315, is a means for receiving the biometric information. In an example, referring to FIG. 11, the biometric information may be obtain by one or more sensors in a mobile device such as the UE 1102 and may be received by the vehicle 1104 via a wireless signal. The biometric information may be provided via an OOB communication and/or included in the payload(s) of one or more ranging messages transmitted from the user's device. For example, the biometric information may be received via control phase messages 1106 (e.g., an OOB signal) and/or via one or more ranging phase messages 1108 (e.g., within the PHY payload 1312). In an example, referring to FIG. 12, the biometric information may be obtained by a local biometric information via a point of access biometric sensor such as the biometric sensor 1206 and received by the controller 1212 via a wired or wireless signal. The biometric information may be digital representations (e.g., extracted data points) of biological data (e.g., fingerprint, face, iris, etc.) and/or other behavioral data (e.g., keystroke dynamics, gait, signature, voice, etc.) that may be obtained from the user of the mobile device.

At stage 1504, the method includes authenticating the user based on the biometric information. The controller 1212, including the processor 310 is a means for authenticating the user. The onboard control system 1104a or the controller 1212 may include previously obtained biometric information associated with the user which may be compared to the biometric information obtained at stage 1502 to authenticate the user. In an example, the biometric information may be used as (or a part of) a certificate to authenticate a UWB session. The previously obtained biometric information may be stored on a data structure that is communicatively coupled to the controller 1212 or the onboard control system 1104a.

At stage 1506, the method includes obtaining one or more radio frequency signals transmitted from the mobile device associated with the user proximate to the first time. The controller 1212, including the processor 310 and the transceiver 315, is a means for obtaining the one or more radio frequency signals. In an example, the one or more radio frequency signals may be ranging signals exchanged with the mobile device. In an example, referring to FIG. 12, the user 1202 may provide the voice input 1208, and the biometric sensor 1206, or one or more proximate wireless devices 1218a, 1218b, may be configured to obtain the one or more radio frequency signals with the UE 1202a. For example, the biometric sensor 1206, or one or more proximate wireless devices 1218a, 1218b, may perform a ranging exchange 1210, 1220a, 1220b, with a UE 1202a that is associated with the user 1202 at approximately the same time (e.g., within 1, 2, 5 10 secs or less) the user 1202 is providing the biometric information.

At stage 1508, the method includes storing signal information associated with the one or more radio frequency signals and the mobile device. The controller 1212, including the processor 310 and the transceiver 315, and the data structure 1214 are means for storing the signal information. In an example, the signal information may be stored in a data structure including data fields based on biometric information and ranging signals acquired at stages 1502 and 1506. The signal information may include range and bearing information (e.g., UERange, UEAoA) and other measurements based on a ranging exchange. Other signal information may include parameters associated with the RF channel that is was used for the ranging exchange(s). Other unique identifying information associated with the one or more radio frequency signals, such as the MAC address of the device, or other parameters that are exchanged over the application at the upper layers may be stored. These fields are examples, and not limitations, as other signal information may be stored.

Figure 16:
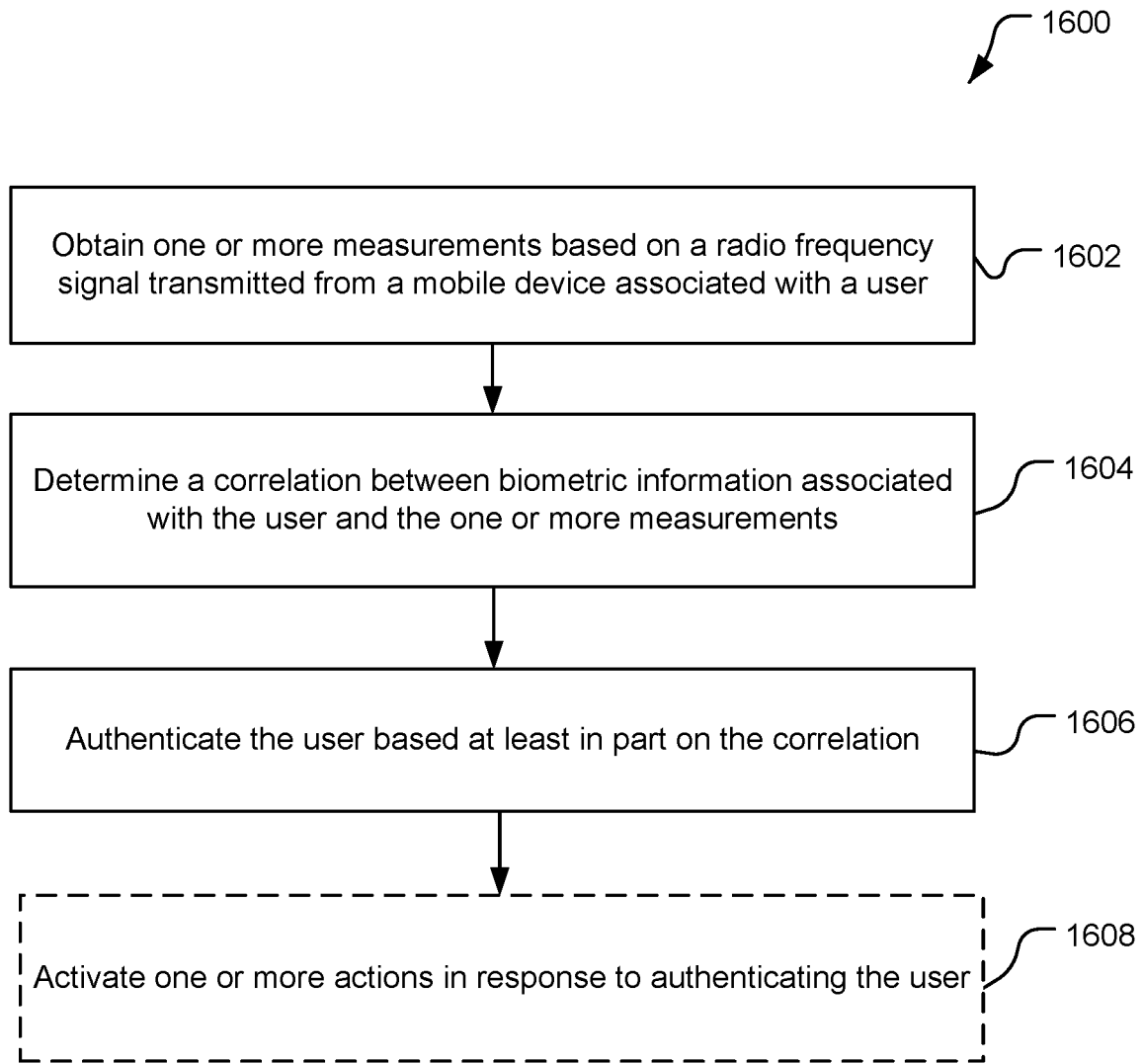
FIG. 16 is an example process flow for authenticating a user based on a mapping between biometric information and a ranging session.

Referring to FIG. 16, with further reference to FIGS. 1-13, a method 1600 for authenticating a user based on a mapping between biometric information and a ranging session includes the stages shown. The method 1600 is, however, an example and not limiting. The method 1600 may be altered, e.g., by having stages added, removed, rearranged, combined, performed concurrently, and/or having single stages split into multiple stages. For example, determining a correlation at stage 1604 and authenticating the user at stage 1606 may be performed in a single stage, and activating actions at stage 1608 is optional.

At stage 1602, the method includes obtaining one or more measurements based on a radio frequency signal transmitted from a mobile device associated with a user. A controller 1212, including a processor 310 and a transceiver 315 is a means for obtaining the one or more measurements. In an example, referring to FIG. 12, the controller 1212 may receive signal measurements associated with the UE 1202*a*. The biometric sensor 1206, or one or more proximate wireless devices 1218*a*, 1218*b*, may perform a ranging exchange 1210, 1220*a*, 1220*b*, with a UE 1202*a* that is associated with the user 1202. The one or more measurements may include range and bearing information (e.g., UERange, UEAoA) and other measurements based on a ranging exchange. Other measurements may include RF parameters associated with the RF channel that was used for the ranging exchange(s), and identifying information associated with the one or more radio frequency signals, such as the MAC address of the device, or other parameters that are exchanged over the application at the upper layers. These measurements are examples, and not limitations, as other RF related measurements may be obtained based on the ranging exchanges 1210, 1220*a*, 1220*b*. In an example, biometric input stored in the UE 1202*a* that is associated with the user 1202 (e.g., a finger print scan received by the UE 1202*a*, gait information computed by the UE 1202*a*, finger swipe recognition obtained by the UE 1202*a*, etc.) may be the one or more measurements provided during the ranging exchange 1210 and stored in the data structure 1214 to be included in the correlation computations.

At stage 1604, the method includes determining a correlation between biometric information associated with the user and the one or more measurements. The controller 1212 including the processor 310 and the data structure 1214 are means for determining the correlation between biometric information and the one or more measurements. In an example, the controller 1212 may be configured to obtain and store parameters associated with previous measurements of RF signal exchanges during prior access events. The parameters may include the biometric information that is obtained concurrently with one or more of the ranging exchanges 1210, 1220*a*, 1220*b*. The parameters may persist in the data structure 1214 and the controller 1212 may be configured to query the data structure 1214 based on the measurements obtained at stage 1602. The query results may return the biometric information associated with the user. Other statistical techniques may be used to correlate the measurements obtained at stage 1602 with the biometric data stored in the data structure 1214. For example, the average, mean, variance and standard deviation of the range information associated with one or more of the prior ranging exchanges 1210, 1220*a*, 1220*b* may be computed. Other context information, such as date and time may be used in combination with the measurements to determine the correlation. Machine learning techniques, or other filtering (e.g., Kalman filter) approaches may be used to determine the correlation.

At stage 1606, the method includes authenticating the user based at least in part on the correlation. The controller 1212 including the processor 310 is a means for authenticating the user. In an example, the authentication is based on a match of the measurements obtained at stage 1602 with the measurements obtained during previous access events when the user provided a biometric input. Other machine learning techniques, or other filtering (e.g., Kalman filter) approaches may be used to authenticate the user. When the authentication is successfully performed, the user 1202 would not be required to provide biometric information and the controller 1212 may be configured to grant access based on the measurements.

At stage 1608, the method optionally includes activating one or more actions in response to authenticating the user. The controller 1212 including the processor 310 is a means for activating the one or more actions. Referring to FIG. 12, the actions may include unlocking and/or automatically opening the door 1204*a*. Other environmental actions or controls such as adjusting the lights in a room, setting climate controls, etc. in anticipation of the user entry may be activated. The method 1600 may also be utilized in vehicle use cases, and the one or more actions may include activating an engine ignition system, or motor activation sequence in response to authenticating the user and determining that the distance is within a threshold value (e.g., 1 m, 2 m, 5 m, 10 m, etc.). Other actions or controls may include unlocking a door, adjusting an environment for the user (e.g., seat position, rear view mirror orientation, radio settings, etc.). Other actions or controls that may be adjusted based on a user's preference may also be activated based on the authentication of the user.

Figure 17:
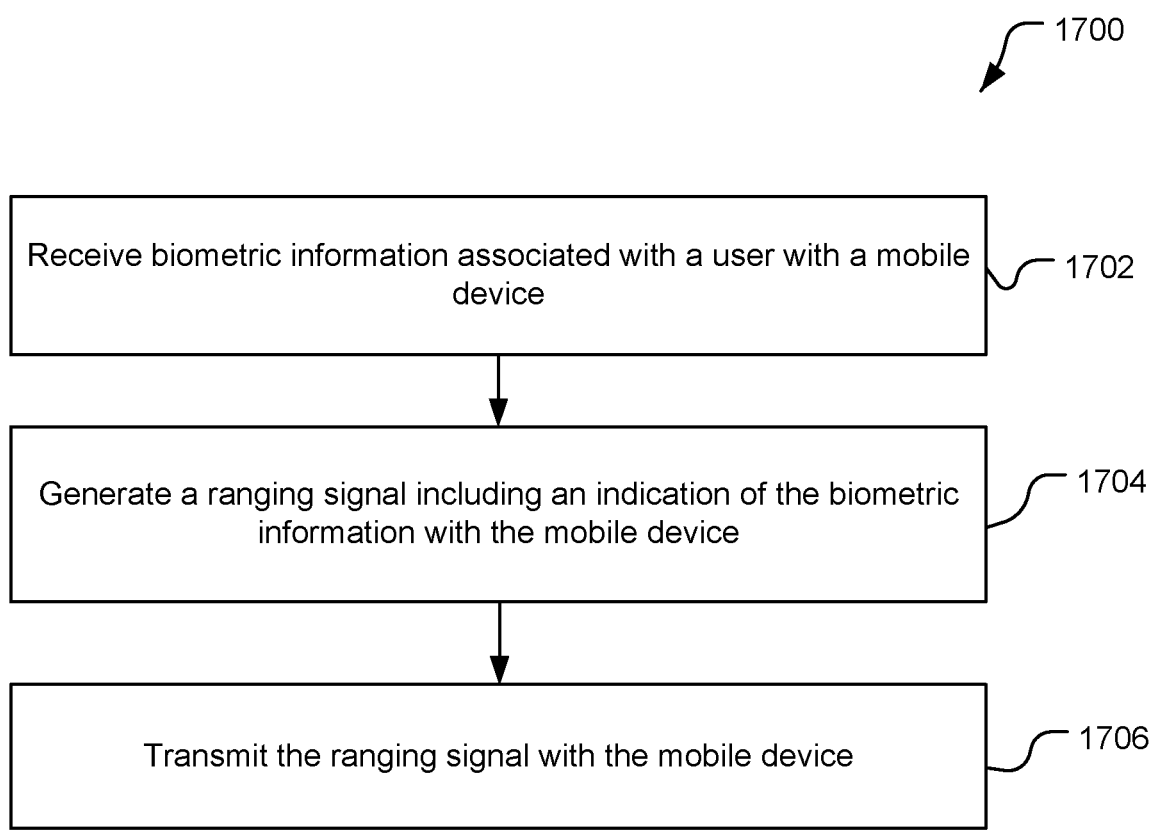
FIG. 17 is an example process flow for transmitting a ranging signal from a mobile device.

Referring to FIG. 17, with further reference to FIGS. 1-13, a method 1700 for transmitting a ranging signal includes the stages shown. The method 1700 is, however, an example and not limiting. The method 1700 may be altered, e.g., by having stages added, removed, rearranged, combined, performed concurrently, and/or having single stages split into multiple stages.

At stage 1702, the method includes receiving biometric information associated with a user with a mobile device. A UE 200, including a processor 210 and a user interface 216, is a means for receiving the biometric information. In an example one or more sensors or user interface components of a mobile device, such as the UE 200, may include one or more biometric sensors configured to obtain biometric information associated with a user. The biometric sensors may include a fingerprint capture device, a microphone (for voice input), the camera 218 (e.g., for facial recognition, iris detection), a display (e.g., for finger swipe recognition) or other such sensors. Inertial measurement sensors in the mobile device may be configured to obtain motion data to determine biometric information such as the user's gait or step length. Other sensors in a mobile device may also be used to obtain biometric information associated with a user.

At stage 1704, the method includes generating a ranging signal including an indication of the biometric information with the mobile device. The UE 200, including the processor 210 and the transceiver 215, is a means for generating the ranging signal. The indication of the biometric information may be a digital representation of the biometric information obtained at stage 1702. For example, the biometric information may be a fingerprint, and the indication of the biometric information may be a feature set extracted from an image of the fingerprint. In an example, the mobile device may be configured as a controller 502 in a UWB ranging session. The mobile device may include the indication of the biometric information in a ranging control message 506 which may utilize an out-of-band transmission. For example, the ranging control message 506 with the biometric information may be provided via a Bluetooth or WiFi transmission. In an example, referring to FIGS. 11 and 13, the indication of the biometric information may be included in one or more ranging phase messages 1108. For example, the PHY payload 1312 may include the biometric information. In an example, the indication of the biometric information may be used as (or a part of) a certificate to authenticate the UWB session. Other radio ranging technologies may be configured to include the biometric information. In an example, NDP frames may be configured to include biometric information.

At stage 1706, the method includes transmitting the ranging signal with the mobile device. The UE 200, including the processor 210 and the transceiver 215, is a means for transmitting the ranging signal. The ranging signal may be transmitted based in the IEEE 802.15.4 standard and may utilize the physical layer (PHY) and media access control (MAC) sublayers to enable secure ranging. In an example, the ranging signal may also utilize IEEE 802.15.4z security features.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for transmitting a ranging signal from a mobile device, comprising: receiving biometric information associated with a user with the mobile device; generating the ranging signal including an indication of the biometric information with the mobile device; and transmitting the ranging signal with the mobile device.

Clause 2. The method of clause 1 wherein the ranging signal is a control phase message in an ultrawideband (UWB) ranging session.

Clause 3. The method of clause 2 wherein the control phase message utilizes an out-of-band signal based at least on one of a WiFi protocol or a Bluetooth protocol.

Clause 4. The method of clause 1 wherein the ranging signal is transmitted in a ranging phase message in an ultrawideband (UWB) ranging session.

Clause 5. The method of clause 1 wherein the ranging signal is based on a WiFi ranging protocol.

Clause 6. The method of clause 1 wherein the biometric information is based on a fingerprint scan, a voice input, a camera input, user gait information, or any combination thereof.

Clause 7. A method of authenticating a user of a mobile device utilizing ranging and biometric information, comprising: receiving biometric information for the user of the mobile device at a first wireless node; determining a distance to the mobile device with respect to the first wireless node; and authenticating the user and the distance to the mobile device based at least in part on the biometric information.

Clause 8. The method of clause 7 wherein receiving the biometric information for the user of the mobile device includes receiving one or more ranging messages including the biometric information.

Clause 9. The method of clause 8 wherein the one or more ranging messages are transmitted in an ultrawideband (UWB) ranging session.

Clause 10. The method of clause 8 wherein the distance to the mobile device is determined based at least in part on the one or more ranging messages.

Clause 11. The method of clause 7 wherein receiving the biometric information for the user of the mobile device includes receiving an input from a biometric sensor at a point of access.

Clause 12. The method of clause 7 further comprising activating one or more actions in response to determining the user is authentic and the distance is within a threshold value to the mobile device.

Clause 13. The method of clause 12 wherein activating the one or more actions includes unlocking a door to a vehicle or unlocking a door to a building.

Clause 14. The method of clause 7 wherein determining the distance to the mobile device is based on a WiFi ranging session.

Clause 15. The method of clause 7 wherein the biometric information is based on a fingerprint scan, a voice input, a camera input, user gait information, or any combination thereof.

Clause 16. A method for mapping between biometric information and a ranging session, comprising: receiving biometric information associated with a user via one or more biometric sensors at a first time; authenticating the user based on the biometric information; obtaining one or more radio frequency signals transmitted from a mobile device associated with the user proximate to the first time; and storing signal information associated with the one or more radio frequency signals and the mobile device.

Clause 17. The method of clause 16 wherein the one or more radio frequency signals are transmitted in an ultrawideband (UWB) ranging session.

Clause 18. The method of clause 17 wherein the one or more biometric sensors are disposed in the mobile device, and the one or more radio frequency signals include an indication of the biometric information.

Clause 19. The method of clause 16 wherein the one or more radio frequency signals are based on a WiFi ranging protocol.

Clause 20. The method of clause 16 wherein the one or more biometric sensors are disposed proximate to a point of access.

Clause 21. The method of clause 20 further comprising: obtaining, at a second time, one or more measurements based on a second radio frequency signal transmitted from the mobile device; determining a correlation between the biometric information associated with the user and the one or more measurements; and authenticating the user based at least in part on the correlation.

Clause 22. The method of clause 21 further comprising activating one or more actions in response to authenticating the user.

Clause 23. The method of clause 22 wherein activating the one or more actions includes unlocking a door to a vehicle or unlocking a door to a building.

Clause 24. An apparatus, comprising: a memory; at least one transceiver; at least one processor communicatively coupled to the memory and the at least one transceiver, and configured to: receive biometric information associated with a user; generate a ranging signal including an indication of the biometric information; and transmit the ranging signal.

Clause 25. The apparatus of clause 24 wherein the ranging signal is a control phase message in an ultrawideband (UWB) ranging session.

Clause 26. The apparatus of clause 25 wherein the control phase message utilizes an out-of-band signal transmitted on at least on one of a WiFi protocol or a Bluetooth protocol.

Clause 27. The apparatus of clause 24 wherein the ranging signal is transmitted in a ranging phase message in an ultrawideband (UWB) ranging session.

Clause 28. The apparatus of clause 24 wherein the ranging signal is transmitted on a WiFi ranging protocol.

Clause 29. The apparatus of clause 24 wherein the biometric information is based on a fingerprint scan, a voice input, a camera input, user gait information, or any combination thereof.

Clause 30. An apparatus, comprising: a memory; at least one transceiver; at least one processor communicatively coupled to the memory and the at least one transceiver, and configured to: receive biometric information for the user of a mobile device; determine a distance to the mobile device; and authenticate the user and the distance to the mobile device based at least in part on the biometric information.

Clause 31. The apparatus of clause 30 wherein the at least one processor is further configured to receive one or more ranging messages including the biometric information for the user of the mobile device.

Clause 32. The apparatus of clause 31 wherein the one or more ranging messages are transmitted in an ultrawideband (UWB) ranging session.

Clause 33. The apparatus of clause 31 wherein the at least one processor is further configured to determine the distance to the mobile device based at least in part on the one or more ranging messages.

Clause 34. The apparatus of clause 30 wherein the at least one processor is further configured to receive the biometric information for the user of the mobile device based on a user input into a biometric sensor at a point of access.

Clause 35. The apparatus of clause 30 wherein the at least one processor is further configured to activate one or more actions in response to determining the user is authentic and that the distance to the mobile device is within a threshold value.

Clause 36. The apparatus of clause 35 wherein the at least one processor is further configured to unlock a door to a vehicle or unlock a door to a building.

Clause 37. The apparatus of clause 30 wherein the at least one processor is further configured to determine the distance to the mobile device based on a WiFi ranging session.

Clause 38. The apparatus of clause 30 wherein the at least one processor is further configured to determine the biometric information based on a fingerprint scan, a voice input, a camera input, user gait information, or any combination thereof.

Clause 39. An apparatus, comprising: a memory; at least one transceiver; at least one processor communicatively coupled to the memory and the at least one transceiver, and configured to: receive biometric information associated with a user via one or more biometric sensors at a first time; authenticate the user based on the biometric information; obtain one or more radio frequency signals transmitted from a mobile device associated with the user proximate to the first time; and store signal information associated with the one or more radio frequency signals and the mobile device.

Clause 40. The apparatus of clause 39 wherein the one or more radio frequency signals are transmitted in an ultrawideband (UWB) ranging session.

Clause 41. The apparatus of clause 40 wherein the one or more biometric sensors are disposed in the mobile device, and the one or more radio frequency signals include an indication of the biometric information.

Clause 42. The apparatus of clause 39 wherein the one or more radio frequency signals are transmitted in a WiFi ranging session.

Clause 43. The apparatus of clause 39 wherein the one or more biometric sensors are disposed proximate to a point of access.

Clause 44. The apparatus of clause 43 wherein the at least one processor is further configured to: obtain, at a second time, one or more measurements based on a second radio frequency signal transmitted from the mobile device; determine a correlation between biometric information associated with the user and the one or more measurements; and authenticate the user based at least in part on the correlation.

Clause 45. The apparatus of clause 44 wherein the at least one processor is further configured to activate one or more actions in response to authenticating the user.

Clause 46. The apparatus of clause 45 wherein the at least one processor is further configured to unlock a door to a vehicle or unlock a door to a building.

47. An apparatus for transmitting a ranging signal from a mobile device, comprising: means for receiving biometric information associated with a user with the mobile device; means for generating the ranging signal including an indication of the biometric information with the mobile device; and means for transmitting the ranging signal with the mobile device.

Clause 48. An apparatus for of authenticating a user of a mobile device utilizing ranging and biometric information, comprising: means for receiving biometric information for the user of the mobile device at a first wireless node; means for determining a distance to the mobile device with respect to the first wireless node; and means for authenticating the user and the distance to the mobile device based at least in part on the biometric information.

Clause 49. An apparatus for mapping between biometric information and a ranging session, comprising: means for receiving biometric information associated with a user via one or more biometric sensors at a first time;

means for authenticating the user based on the biometric information; means for obtaining one or more radio frequency signals transmitted from a mobile device associated with the user proximate to the first time; and means for storing signal information associated with the one or more radio frequency signals and the mobile device.

Clause 50. The apparatus of clause 49 wherein the one or more biometric sensors are disposed proximate to a point of access and the apparatus further comprises: means for obtaining, at a second time, one or more measurements based on a second radio frequency signal transmitted from the mobile device; means for determining a correlation between biometric information associated with the user and the one or more measurements; and means for authenticating the user based at least in part on the correlation.

Clause 51. A non-transitory processor-readable storage medium comprising processor-readable instructions configured to cause one or more processors to transmit a ranging signal from a mobile device, comprising: code for receiving biometric information associated with a user with the mobile device; code for generating the ranging signal including an indication of the biometric information with the mobile device; and code for transmitting the ranging signal with the mobile device.

Clause 52. A non-transitory processor-readable storage medium comprising processor-readable instructions configured to cause one or more processors to authenticate a user of a mobile device utilizing ranging and biometric information, comprising: code for receiving biometric information for the user of the mobile device at a first wireless node; code for determining a distance to the mobile device with respect to the first wireless node; and code for authenticating the user and the distance to the mobile device based at least in part on the biometric information.

Clause 53. A non-transitory processor-readable storage medium comprising processor-readable instructions configured to cause one or more processors to map between biometric information and a ranging session, comprising: code for receiving biometric information associated with a user via one or more biometric sensors at a first time; code for authenticating the user based on the biometric information; code for obtaining one or more radio frequency signals transmitted from a mobile device associated with the user proximate to the first time; and code for storing signal information associated with the one or more radio frequency signals and the mobile device.

Clause 54. The non-transitory processor-readable storage medium of clause 53 wherein the one or more biometric sensors are disposed proximate to a point of access and further comprising: code for obtaining, at a second time, one or more measurements based on a second radio frequency signal transmitted from the mobile device; code for determining a correlation between biometric information associated with the user and the one or more measurements; and code for authenticating the user based at least in part on the correlation.

The invention claimed is:

1. A method for transmitting a ranging signal from a mobile device, comprising:
receiving biometric information associated with a user with the mobile device;
generating the ranging signal including an indication of the biometric information with the mobile device, the ranging signal being one of a control phase message in an ultrawideband (UWB) ranging session or a ranging initiation message in the UWB ranging session; and
transmitting the ranging signal with the mobile device.

2. The method of claim 1 wherein the ranging signal is the control phase message and the control phase message utilizes an out-of-band signal based at least on one of a WiFi protocol or a Bluetooth protocol.

3. The method of claim 1 wherein the ranging signal is based on a WiFi ranging protocol.

4. The method of claim 1 wherein the biometric information is based on a fingerprint scan, a voice input, a camera input, user gait information, or any combination thereof.

5. A method of authenticating a user of a mobile device utilizing ranging and biometric information, comprising:
receiving biometric information for the user of the mobile device at a first wireless node;
determining a distance to the mobile device with respect to the first wireless node using a ranging session; and
authenticating the user and the distance to the mobile device based at least in part on the biometric information, wherein authenticating the distance comprises authenticating the ranging session based on the biometric information.

6. The method of claim 5 wherein receiving the biometric information for the user of the mobile device includes receiving one or more ranging messages including the biometric information.

7. The method of claim 6 wherein the one or more ranging messages are transmitted in an ultrawideband (UWB) ranging session.

8. The method of claim 6 wherein the distance to the mobile device is determined based at least in part on the one or more ranging messages.

9. The method of claim 5 wherein receiving the biometric information for the user of the mobile device includes receiving an input from a biometric sensor at a point of access.

10. The method of claim 5 further comprising activating one or more actions in response to determining the user is authentic and the distance is within a threshold value to the mobile device.

11. The method of claim 10 wherein activating the one or more actions includes unlocking a door to a vehicle or unlocking a door to a building.

12. The method of claim 5 wherein determining the distance to the mobile device is based on a WiFi ranging session.

13. The method of claim 5 wherein the biometric information is based on a fingerprint scan, a voice input, a camera input, user gait information, or any combination thereof.

14. A method for mapping between biometric information and a ranging session, comprising:
receiving biometric information associated with a user via one or more biometric sensors at a first time;
authenticating the user based on the biometric information;
obtaining, at an apparatus separate from a mobile device, one or more radio frequency signals transmitted from the mobile device, associated with the user, proximate to the first time; and
storing, at the apparatus, signal information associated with the one or more radio frequency signals and the mobile device.

15. The method of claim 14 wherein the one or more radio frequency signals are transmitted in an ultrawideband (UWB) ranging session.

16. The method of claim 15 wherein the one or more biometric sensors are disposed in the mobile device, and the one or more radio frequency signals include an indication of the biometric information.

17. The method of claim 14 wherein the one or more radio frequency signals are based on a WiFi ranging protocol.

18. The method of claim 14 wherein the one or more biometric sensors are disposed proximate to a point of access.

19. The method of claim 18 further comprising:
obtaining, at a second time, one or more measurements based on a second radio frequency signal transmitted from the mobile device;
determining a correlation between the biometric information associated with the user and the one or more measurements; and
authenticating the user based at least in part on the correlation.

20. The method of claim 19 further comprising activating one or more actions in response to authenticating the user.

21. The method of claim 20 wherein activating the one or more actions includes unlocking a door to a vehicle or unlocking a door to a building.

22. An apparatus, comprising:
a memory;
at least one transceiver;
at least one processor communicatively coupled to the memory and the at least one transceiver, and configured to:
receive biometric information associated with a user;
generate a ranging signal including an indication of the biometric information, the ranging signal being one of a control phase message in an ultrawideband (UWB) ranging session or a ranging initiation message in the UWB ranging session; and
transmit the ranging signal.

23. The apparatus of claim 22 wherein the ranging signal is the control phase message and the control phase message utilizes an out-of-band signal transmitted on at least on one of a WiFi protocol or a Bluetooth protocol.

24. The apparatus of claim 22 wherein the at least one processor is configured to transmit the ranging signal on a WiFi ranging protocol.

25. The apparatus of claim 22 wherein the biometric information is based on a fingerprint scan, a voice input, a camera input, user gait information, or any combination thereof.

26. An apparatus, comprising:
a memory;
at least one transceiver;
at least one processor communicatively coupled to the memory and the at least one transceiver, and configured to:
receive biometric information for the user of a mobile device;
determine a distance to the mobile device using a ranging session; and
authenticate the user and the distance to the mobile device based at least in part on the biometric information, wherein to authenticate the distance the at least one processor is configured to authenticate the ranging session based on the biometric information.

27. The apparatus of claim 26 wherein the at least one processor is further configured to receive one or more ranging messages including the biometric information for the user of the mobile device.

28. The apparatus of claim 27 wherein the one or more ranging messages are transmitted in an ultrawideband (UWB) ranging session.

29. The apparatus of claim 27 wherein the at least one processor is further configured to determine the distance to the mobile device based at least in part on the one or more ranging messages.

30. The apparatus of claim 26 wherein the at least one processor is further configured to receive the biometric information for the user of the mobile device based on a user input into a biometric sensor at a point of access.

31. The apparatus of claim 26 wherein the at least one processor is further configured to activate one or more actions in response to determining the user is authentic and that the distance to the mobile device is within a threshold value.

32. The apparatus of claim 31 wherein the at least one processor is further configured to unlock a door to a vehicle or unlock a door to a building.

33. The apparatus of claim 26 wherein the at least one processor is further configured to determine the distance to the mobile device based on a WiFi ranging session.

34. The apparatus of claim 26 wherein the at least one processor is further configured to determine the biometric information based on a fingerprint scan, a voice input, a camera input, user gait information, or any combination thereof.

35. An apparatus, comprising:
a memory;
at least one transceiver;
at least one processor communicatively coupled to the memory and the at least one transceiver, and configured to:
receive biometric information associated with a user via one or more biometric sensors at a first time;
authenticate the user based on the biometric information;
obtain one or more radio frequency signals transmitted from a mobile device associated with the user proximate to the first time, the mobile device being separate from the apparatus; and
store, in the memory, signal information associated with the one or more radio frequency signals and the mobile device.

36. The apparatus of claim 35 wherein the one or more radio frequency signals are transmitted in an ultrawideband (UWB) ranging session.

37. The apparatus of claim 36 wherein the one or more biometric sensors are disposed in the mobile device, and the one or more radio frequency signals include an indication of the biometric information.

38. The apparatus of claim 35 wherein the one or more radio frequency signals are transmitted in a WiFi ranging session.

39. The apparatus of claim 35 wherein the one or more biometric sensors are disposed proximate to a point of access.

40. The apparatus of claim 39 wherein the at least one processor is further configured to:
obtain, at a second time, one or more measurements based on a second radio frequency signal transmitted from the mobile device;
determine a correlation between biometric information associated with the user and the one or more measurements; and
authenticate the user based at least in part on the correlation.

41. The apparatus of claim 40 wherein the at least one processor is further configured to activate one or more actions in response to authenticating the user.

42. The apparatus of claim 41 wherein the at least one processor is further configured to unlock a door to a vehicle or unlock a door to a building.

* * * * *